US011236857B2

(12) United States Patent
Mullet et al.

(10) Patent No.: US 11,236,857 B2
(45) Date of Patent: Feb. 1, 2022

(54) LOW PROFILE REMOTE AND WALL PLATE APPARATUS

(71) Applicant: Current Products Corp., Pensacola, FL (US)

(72) Inventors: Willis J. Mullet, Gulf Breeze, FL (US); Scott Hand, Pace, FL (US); Mike Poulton, Elberta, AL (US)

(73) Assignee: CURRENT PRODUCTS CORP., Pensacola, FL (US)

( * ) Notice: Subject to any disclaimer, the term of this patent is extended or adjusted under 35 U.S.C. 154(b) by 0 days.

(21) Appl. No.: 16/744,907

(22) Filed: Jan. 16, 2020

(65) Prior Publication Data

US 2020/0232599 A1    Jul. 23, 2020

Related U.S. Application Data

(60) Provisional application No. 62/793,955, filed on Jan. 18, 2019.

(51) Int. Cl.
| *F16M 11/00* | (2006.01) |
| *F16M 13/02* | (2006.01) |
| *F16B 1/00* | (2006.01) |

(52) U.S. Cl.
CPC .............. *F16M 13/02* (2013.01); *F16B 1/00* (2013.01); *F16B 2001/0035* (2013.01)

(58) Field of Classification Search
CPC ............ F16B 1/00; F16M 13/02; F16M 11/00
See application file for complete search history.

(56) References Cited

U.S. PATENT DOCUMENTS

| 4,893,435 A | 1/1990 | Shalit |
| 4,928,778 A | 5/1990 | Tin |
| 7,071,836 B2 | 7/2006 | Baud |
| 7,844,353 B2 | 11/2010 | Bejean et al. |
| 8,981,681 B2 | 3/2015 | Malekpour |
| 9,091,118 B2 | 7/2015 | Anderson et al. |
| 9,167,669 B2 | 10/2015 | Karc et al. |
| 9,530,550 B2 * | 12/2016 | Huang ................. H01F 7/0252 |
| 10,072,458 B2 | 9/2018 | Mullet |
| 10,075,665 B2 | 9/2018 | Demskie |

(Continued)

FOREIGN PATENT DOCUMENTS

| WO | 2003007266 | 1/2003 |
| WO | 2014165367 | 10/2014 |
| WO | 2014165470 | 10/2014 |

*Primary Examiner* — Amy J. Sterling
(74) *Attorney, Agent, or Firm* — Christopher A. Proskey; BrownWinick Law Firm

(57) ABSTRACT

A multi-function remote control system and mounting apparatus is presented. The remote control configured to magnetically attach and detach from an adhering plate or mounting plate located against a wall or other surface. The remote control is configured to self-center or self-orient in flush, planar engagement with an adhering plate or mounting plate. The remote control includes a plurality of push buttons wherein when pressed a plurality of window coverings are moved to a predetermined position. The mounting features of the remote control can be completely concealed from view for an aesthetically pleasing appearance. The adhering plate includes an adhesive which adheres the adhering plate to the wall for easy and convenient installation.

52 Claims, 26 Drawing Sheets

(56) References Cited

U.S. PATENT DOCUMENTS

| | | | | |
|---|---|---|---|---|
| 2012/0104197 A1* | 5/2012 | Jensen | ............... | F16M 13/02 |
| | | | | 248/205.1 |
| 2012/0275633 A1* | 11/2012 | Schreiber | ............. | H04R 1/08 |
| | | | | 381/361 |
| 2014/0378061 A1 | 12/2014 | Pellarin | | |
| 2016/0168906 A1 | 6/2016 | Mullet | | |
| 2017/0172333 A1 | 6/2017 | Mullet | | |
| 2019/0005809 A1 | 1/2019 | Dimberg | | |

* cited by examiner

LOW PROFILE REMOTE AND WALL PLATE APPARATUS

CROSS REFERENCE TO RELATED APPLICATIONS

This application claims priority to U.S. Provisional Application No. 62/793,955 which was filed on Jan. 18, 2019, the entirety of which is incorporated herein fully by reference.

FIELD OF THE DISCLOSURE

This disclosure relates to control technology, such as remote controls. More specifically, and without limitation, this disclosure relates to a low profile remote control system. More specifically, and without limitation, this disclosure relates to a low profile remote control system and a means for attaching the remote control to a surface such as a wall.

BACKGROUND OF DISCLOSURE

Remote controls are old and well known in the art. Conventional remote controls have been utilized to remotely control countless electronic devices such as garage doors, television sets and door locks on vehicles, to name a few. While the capability, range, durability and functionality of remote controls have improved over time, substantial deficiencies still exist in the art. Namely, remotes are often lost or misplaced because there is no convenient area to place or hold conventional remotes. Another deficiency with current remote technology is that conventional remote control technology lacks the capability to control new electronic devices, such as new motorized window coverings, in a manner that suits the ever increasing demands of the consumer, and particularly newer generations of consumers. Another deficiency with current remote control technology is that the remotes themselves as well as their holders are aesthetically unappealing. Another deficiency with current remote control technology is that their holders are unnecessarily difficult or time consuming to install as well as being unnecessarily permanent once installed.

Window coverings, such as curtains, shades, draperies and the like are frequently used to provide privacy and to limit the amount of light that is permitted to pass through a window and into a room or building. There are countless types, forms and designs of window coverings known in the art. The term window covering is used to describe any and all of these types, forms and designs including blinds, shades, draperies, and the like.

One form of a window covering, of particular interest in this application, is a roll shade (hereinafter "roll shade"). Common components of roll shades include a roll tube rotatably connected to brackets on opposing ends. The roll shade is positioned above or adjacent to a window or door. In one arrangement of a roll shade, shade material is wrapped around the roll tube and connected to a bottom bar, as the roll tube rotates the shade material is wrapped or unwrapped around the roll tube thereby opening and closing the roll shade.

Another form of window covering, of particular interest in this application, is a honeycomb shade and Venetian shade (hereinafter "honeycomb shade" and "venetian shade"). Common components of honeycomb shades and Venetian shades include a header and a bottom bar with shade material extending there between. In the case of a honeycomb shade a single panel of material extends between the header and the bottom bar, whereas, in the case of a Venetian shade, a plurality of slats are held within ladders that extend between the header and the bottom bar. Both honeycomb shades and Venetian shades have suspension cords that extend from the header to the bottom bar. These suspension cords are connected to a drive mechanism, which when actuated raise and lower the bottom bar by winding or unwinding the suspension cords.

Yet another form of a window covering, of particular interest in this application, is a drapery shade (hereinafter "drapery"). Common components of drapery include a support rod connected at its ends to brackets and shade material connected to and hanging down from the support rod. Drapery shades can include blackout shades and shear shades which can be independently opened and controlled by laterally sliding them along the support rod.

Recent improvements in motorization and motor control technologies have allowed manufacturers to motorize these various window coverings in new ways. While the motorization of window coverings has provided certain advantages, one deficiency is that conventional remote control technology lacks convenient, easy to install, usable, functional and aesthetically pleasing ways for the remotes to be installed and held in place and accessible for use.

As such, there is a need in the art for convenient remote control installation packages, techniques, and the like. The need for simplified, even foolproof, installation, has become ever more important with new generations of users who may lack the tools and/or capabilities to install complex window covering assemblies and remote controls, or simply newer generations of users which expect more ease and access of controls.

Thus, it is a primary object of the disclosure to provide a remote control system to manipulate window coverings that improves upon the state of the art.

Another object of the disclosure is to provide a remote control system to manipulate window coverings that is easy to use.

Yet another object of the disclosure is to provide a remote control system that is easy to install.

Another object of the disclosure is to provide a remote control system that can be conveniently located.

Yet another object of the disclosure is to provide a remote control system that can be installed without damaging the surfaces of a building.

Another object of the disclosure is to provide a remote control system that is aesthetically pleasing.

Yet another object of the disclosure is to provide a remote control system that can be easily removed from a surface for use.

Another object of the disclosure is to provide a remote control system that can be easily returned to a surface after use.

Yet another object of the disclosure is to provide a remote control system that can conceal its attachment means.

Another object of the disclosure is to provide a remote control system that is self-centering.

Yet another object of the disclosure is to provide a remote control system that is self-orienting.

Another object of the disclosure is to provide a remote control system that is user friendly to use.

Yet another object of the disclosure is to provide a remote control system that is efficient.

Another object of the disclosure is to provide a remote control system that is simple in design.

Yet another object of the disclosure is to provide a remote control system that is relatively inexpensive.

Another object of the disclosure is to provide a remote control system that has a minimum number of parts.

Yet another object of the disclosure is to provide a remote control system that has an intuitive design.

Another object of the disclosure is to provide a remote control system that is intuitive to install.

Yet another object of the disclosure is to provide a remote control system that has an installation that is quick.

Another object of the disclosure is to provide a remote control system that a user can remove from a surface and return to the surface in an efficient and easy manner.

Another object of the disclosure is to provide a remote control system that provides for storage of remote controls in an aesthetically pleasing manner.

Yet another object of the disclosure is to provide a remote control system that provides improved functionality.

Another object of the disclosure is to provide a remote control system that improves the accuracy of control.

Yet another object of the disclosure is to provide a remote control system that has a minimum number of buttons.

Another object of the disclosure is to provide a remote control system that provides a convenient and secure place to hold the remote.

Yet another object of the disclosure is to provide a remote control system that utilizes standard parts and components, where possible.

These and other objects, features, or advantages of the present disclosure will become apparent from the specification and claims.

SUMMARY OF THE DISCLOSURE

A multi-function remote control, holding apparatus and installation system is presented wherein the remote control is of a small stature and is aesthetically pleasing and easy to remove and replace to a convenient holding location. The remote control is magnetically held against an adhering plate which can be connected to any appropriate, convenient surface with minimal effort. The remote control can be easily dislodged from the adhering plate and replaced against the adhering plate with ease. The remote control includes a plurality of intuitive functions. The remote control will self-center and/or self-orient so as to always have the same appearance even if attached in an off-center or off-oriented manner.

DETAILED DESCRIPTION OF THE DISCLOSURE

Figure 1:
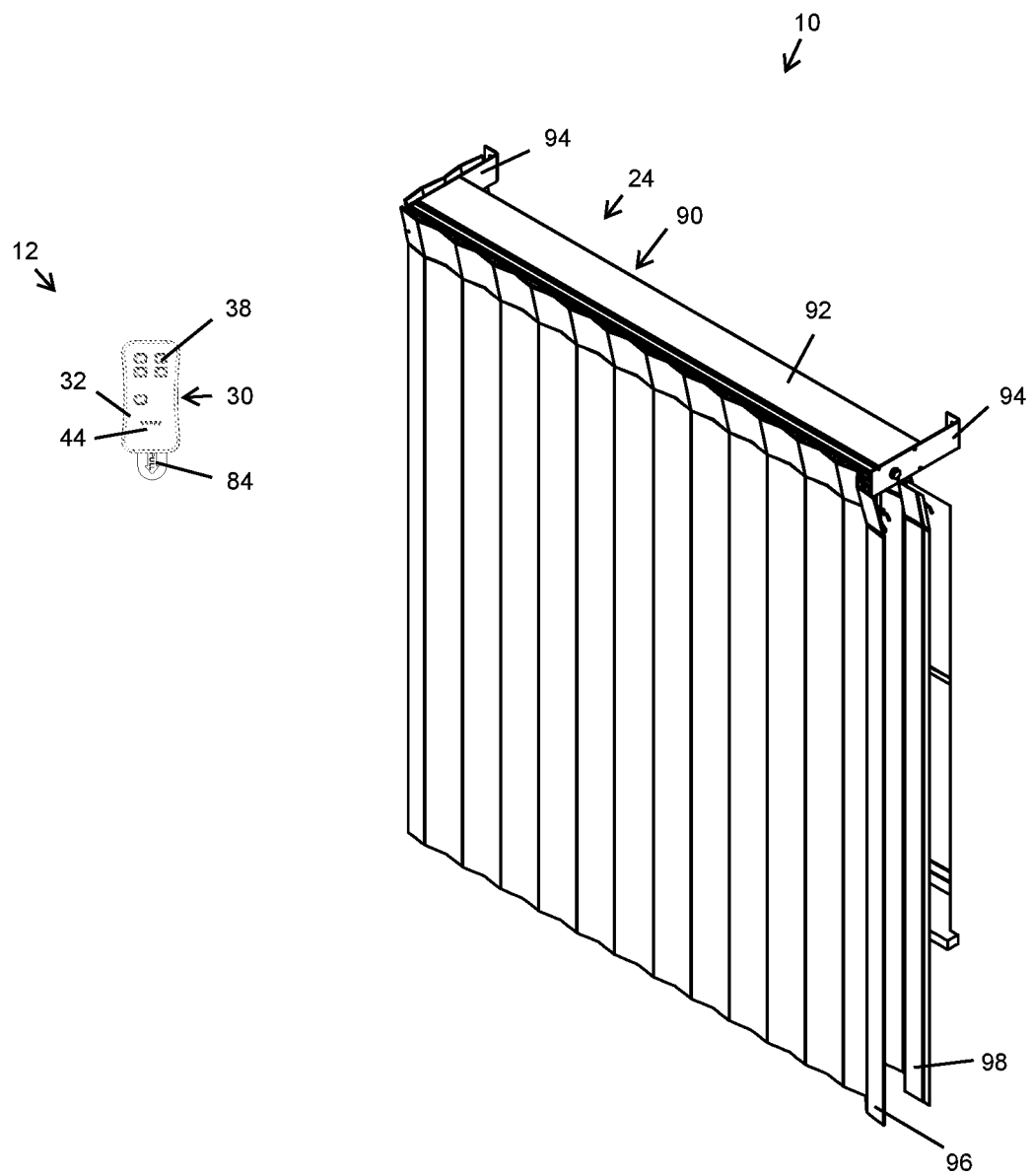
FIG. 1 is an elevation view of a remote control having a plurality of push buttons, a plurality of indicator lights, and a tab; the view showing a perspective view of a drapery with opposing brackets placed on each end of a support bar, the drapery having a blackout curtain and a shear curtain.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure (s). The following detailed description is, therefore, not to be taken in a limiting sense, and the scope is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

As used herein, the disclosure is shown and described as being used in association with a window covering, however the disclosure is not so limiting. Instead, one of ordinary skill in the art will appreciate that the remote control system and method of use and attachment means, presented herein, can be applied to any mechanical device or electrical device, without limitation. Other examples of these various applications are any applications which may be used with a remote control, including but not limited to, ceiling fans, lamp or lamp assemblies, televisions, other electronic and mechanical equipment, and the like. The system is merely shown and described as being used in association with a window covering for ease of description and as one of countless examples.

As used herein, the term window covering refers to any covering such as a blind, drapery, roller shade, venetian blind or the like, used especially in association with windows. This term is in no way meant to be limiting. Instead, one of ordinary skill in the art will appreciate that the system presented herein can be applied to any window covering, without limitation. Going a step further, while use of the remote described herein is identified as being used with a window covering, the system is not so limited as use with a motorized window covering is only one of countless examples of potential use. Instead, it is hereby contemplated that the remote control system presented herein may be used with any wirelessly controlled device, including but not limited to, motorized window coverings.

System:

With reference to the figures, a remote control system 10 (or simply "system 10") is presented. System 10 is formed of any suitable size, shape and design and is configured to facilitate a user in the smooth and convenient operation of remote control 12, including but not limited to, removing and replacing remote control 12 from a docked position. System 10 is configured to facilitate easy and convenient removal and replacement of remote control 12 from a docked position while being aesthetically pleasing in design.

In the arrangement shown, as one example, system 10 includes the following components: a remote control 12, an adhering plate 14, an adhesive 16, and may also include a mounting plate 18, a wall 22, and may also include an attachment plate 20, and a window covering 24, among other components.

Remote Control:

System 10 includes a remote control 12. Remote control 12 is formed of any suitable size, shape and design and is configured to provide quick and convenient control of motorized window coverings 24 from a distance, or control of any other electronics and mechanical equipment, in an easy to use and aesthetically pleasing manner.

In the arrangement shown, as one example, remote control 12 has a main body 30, a front side 32 and a back side 34, which connect to one another in a clamshell-type fashion along a seam line 36 there between. In one arrangement, as is shown, remote control 12 is generally flat and rectangular in shape with a generally planar front surface and a generally planar back surface which extend in approximate parallel spaced relation to one another. Remote control 12 also includes an exterior peripheral edge 28. Additionally, two parallel spaced edges of the exterior peripheral edge 28 are closer to one another near the center of remote control 12 as if pinching remote control 12 inward at the middle when viewed from the front or rear. In other words, when viewed from the front or rear, the peripheral edge 28 of remote control 12 has a has slightly inwardly curved opposing sides that in one manner of speaking form a dog bone appearance with the width at the top and bottom being slightly greater than the width in the middle, as measured from one side to another. Other than this inward pinch, remote control 12 is generally square or rectangular when viewed from the front or back.

In the arrangement shown, as one example, remote control 12 includes an exterior peripheral edge 28 that is generally square to the planes formed by the front and back surfaces, but may contain rounded, curved, angled or softened corners. That is, exterior peripheral edge 28 includes top and bottom edges which are generally square to the planes formed by the front and back surfaces, and exterior peripheral edge 28 includes side edges which are generally square to the planes formed by the front and back surfaces. In the arrangement shown, as one example, the top and bottom edges extend in approximate parallel spaced relation to one another. In the arrangement shown, as one example, the top and bottom edges extend in approximate perpendicular alignment to opposing side edges which connect at the ends of the top and bottom edges. In the arrangement shown, as one example, remote control 12 also includes rounded corners and rounded edges for improved aesthetics and user friendly gripping and comfort.

Remote control 12 includes a plurality of push buttons 38. In the arrangement shown, as one example, push buttons 38 are generally square or rectangular in shape and are positioned in vertical and horizontal alignment with one another along symmetrical orientation nearer one end of remote control 12. Alternatively, a variety of push button 38 arrangements are hereby contemplated for. In the arrangement shown, as one example, five push buttons 38 are shown, however, any other number of push buttons 38 is hereby contemplated for use including more or less push buttons 38 such as one, two, three, five, six, ten, or more. Furthermore, in the arrangement shown, as one example, push buttons 38 are on the front side 32 of remote control 12.

Capacitive Touch Screen: In an alternative embodiment, remote control 12 includes a capacitive touch screen 40. Capacitive touch screen 40 is formed of any suitable size, shape and design and is configured to facilitate user control with various control capacities including, but not limited to, dimming, changing motor speeds of fans, opening or closing window coverings 24 to different levels, and more. Capacitive touch screen 40 is configured to detect and measure touch. In other words, a capacitive touch screen 40 includes a capacitive touch sensor 42. Capacitive touch sensor 42 is formed of any suitable size, shape and design and is configured to sense touch by a user and provide the user with a plurality of scales, or capacities, with which to adjust window coverings 24 and other electronics and mechanical devices.

Capacitive touch screen 40 is generally elongated and rectangular in shape, when viewed from the front. Generally capacitive touch screen 40 is in horizontal alignment along the upper side of the front side 32 of remote control 12. Alternatively, capacitive touch screen 40 may be located along another spot of remote control 12 and may take on any shape. In another arrangement, capacitive touch screen 40 may be used alongside a plurality of push buttons 38. Due to the elongated horizontal alignment, capacitive touch screen 40 lends itself well, in the user's mind, to horizontal actuation of window coverings 24, that is gauging the amount of opening and closing of roller shade, venetian and/or honeycomb shades 100 in correlation with the amount of slide a user initiates across the capacitive touch sensor 42 or the capacitive touch screen 40. Whereas, push buttons 38 lend themselves well, in the user's mind, to on and/or off type of functions. Push buttons 38 also lend themselves well, in the user's mind, to a fully open or fully closed functionality.

Capacitive touch screen 40 may have a plurality of zones for actuation. That is, when different zones of capacitive touch screen 40 are initiated by a user, different signals are sent by remote control 12 depending on the distance a user slides their finger across the capacitive touch sensor 42 and/or depending on the location of the capacitive touch screen 40 the user initiates. In other words, capacitive touch screen 40 is capable of a plurality of functions and capable of housing a plurality of on/off functions or variable functionalities including dimming, or percentage capacity operations.

Any other form or shape or configuration of an input is hereby contemplated for use with remote control 12 in addition to buttons 38 or a touch screen 40.

Indicators: Remote control 12 includes a plurality of indicators 44. Indicators 44 are formed of any suitable size, shape and design and are configured to clearly notify the user of the current status of the remote control 12 and/or various systems being controlled by remote control 12. In addition, indicator 44 is configured to notify the user of control options and other variables and notices available to a user to make use of remote control 12 clear, easy, and efficient.

In one arrangement, remote control 12 is a multi-channel remote, wherein each channel may be used to control different electronic devices, and indicators 44 are associated with each channel selected. In one arrangement, as is shown, indicators 44 are a row of lights, LEDs or the like which are positioned in lateral alignment in the front side 32 of remote control 12, nearer one end of remote control 12. Alternatively, indicators 44 could be positioned along the top side of the front side 32 of remote control 12 or any other portion of remote control 12.

In one arrangement, as one of the plurality of push buttons 38, or alternatively a capacitive touch sensor 42, is used to select a channel or other option, the light or LED associated with the channel or functionality of the indicator 44 will illuminate. In this way, the user can select which channel remote control 12 will communicate on. In one arrangement, each time a button 38 is pressed or sensed, the indicator 44 of the selected channel illuminates. In another arrangement, remote control 12 includes a motion sensor, such as an accelerometer, that senses when the remote is being moved and in response the selected indicator 44 illuminates. In another arrangement, remote control 12 may be equipped with a radio frequency or distance sensor and automatically connects to the equipment nearest remote control 12. Thus, remote control 12 can control the nearest equipment. In one arrangement, remote control 12 includes a setting selectable by a push button 38 or capacitive touch sensor 42 where all channels are selected simultaneously, and corresponding thereto all the indicators 44 illuminate.

Figure 2:
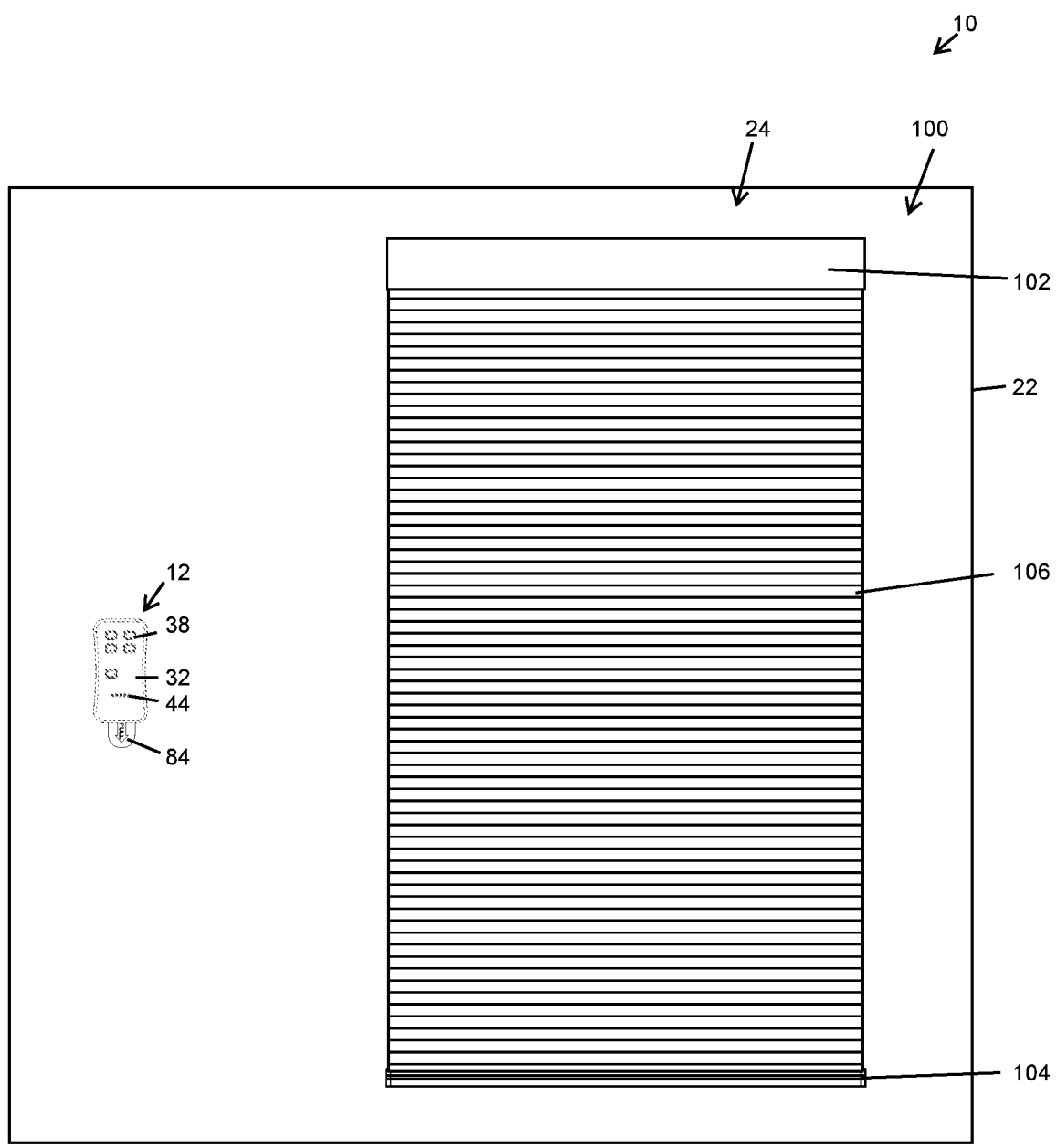
FIG. 2 is a front elevation view of a remote control having a plurality of push buttons, a plurality of indicator lights, and a tab; the view showing a honeycomb shade with a header, a bottom bar, and shade material.
Figure 3:
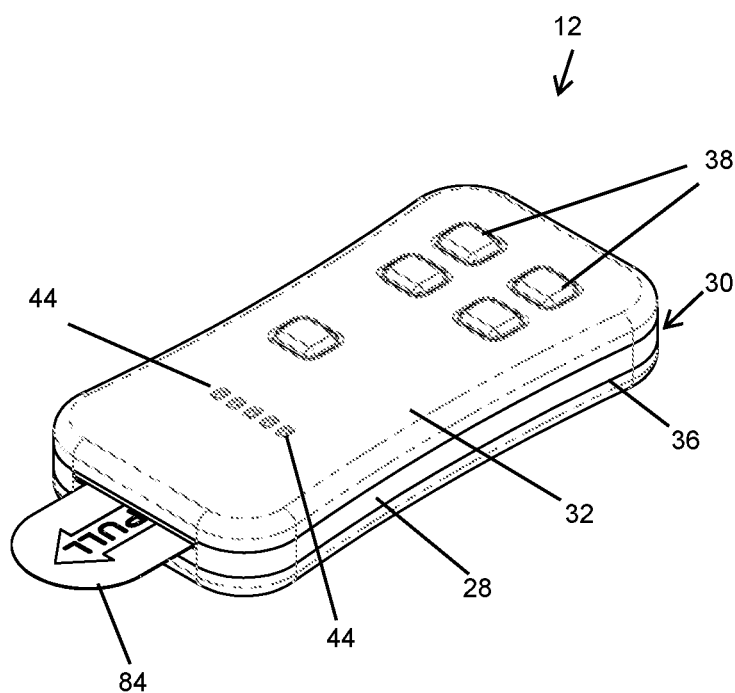
FIG. 3 is a front perspective view of the remote of FIG. 1; the view showing a remote control with a front side, a plurality of push buttons, a plurality of indicator lights, and a tab.
Figure 4:
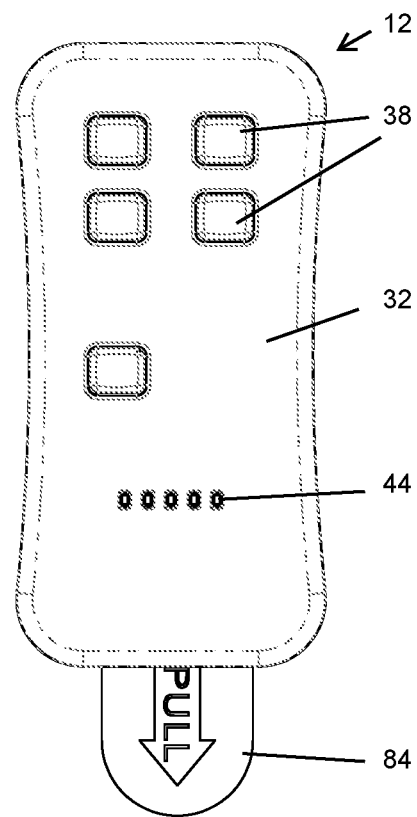
FIG. 4 is a front elevation view of the remote control of FIG. 1; the view showing a remote control with a front side, a plurality of push buttons, a plurality of indicator lights, and a tab.
Figure 5:
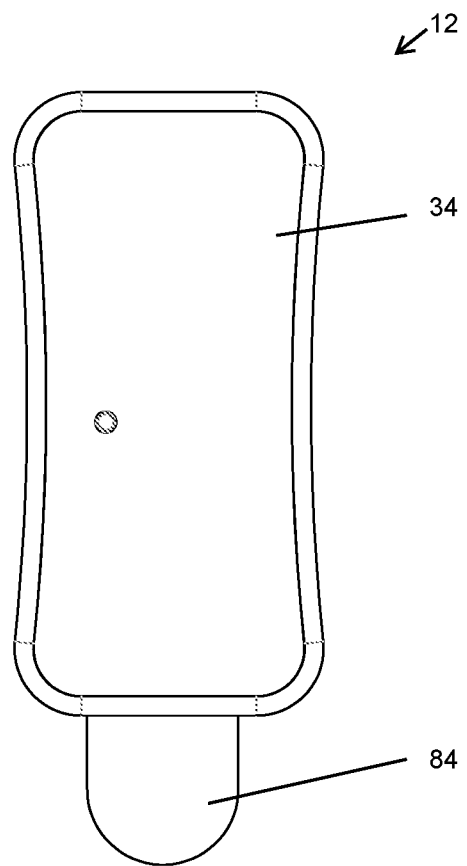
FIG. 5 is a rear elevation view of the remote control of FIG. 1; the view showing a remote control with a front side, a plurality of push buttons, a plurality of indicator lights, and a tab.
Figure 6:
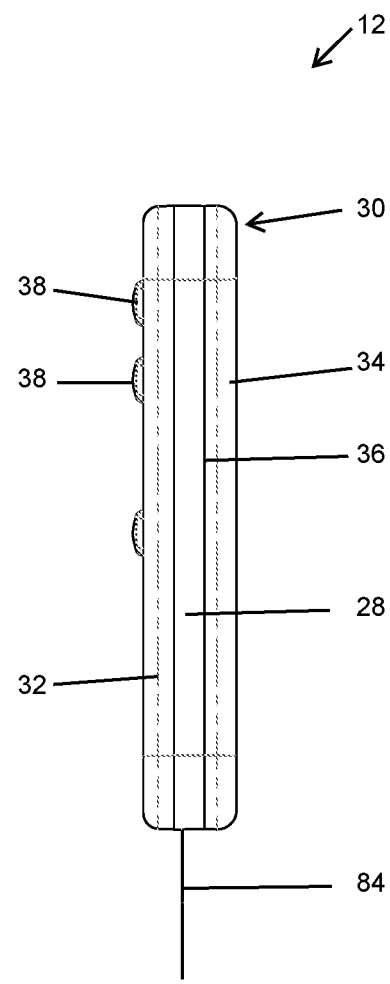
FIG. 6 is a side elevation view of the remote control of FIG. 1; the view showing a remote control with a front side, a back side, and a seam line between the front side and the back side, a plurality of push buttons, and a tab.
Figure 7:
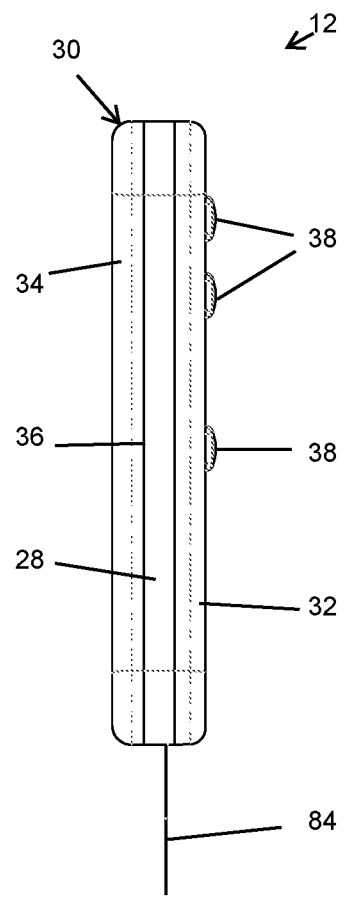
FIG. 7 is a side elevation view of the remote control of FIG. 1; the view showing a remote control with a front side, a back side, and a seam line between the front side and the back side, a plurality of push buttons, and a tab.
Figure 8:
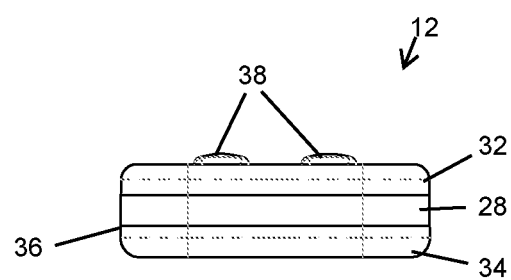
FIG. 8 is a top elevation view of the remote control of FIG. 1; the view showing a remote control with a front side, a back side, and a seam line between the front side and the back side, and a plurality of push buttons.
Figure 9:
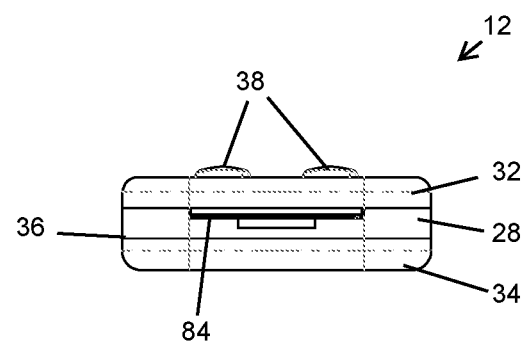
FIG. 9 is a bottom elevation view of the remote control of FIG. 1; the view showing a remote control with a front side, a back side, and a seam line between the front side and the back side, a plurality of push buttons, and a tab.
Figure 10:
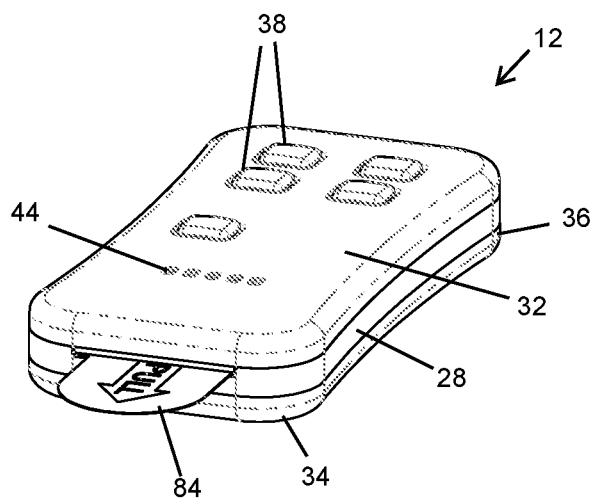
FIG. 10 is a front, lower perspective view of the remote of FIG. 1; the view showing a remote control with a front side, a plurality of push buttons, a plurality of indicator lights, and a tab.
Figure 11:
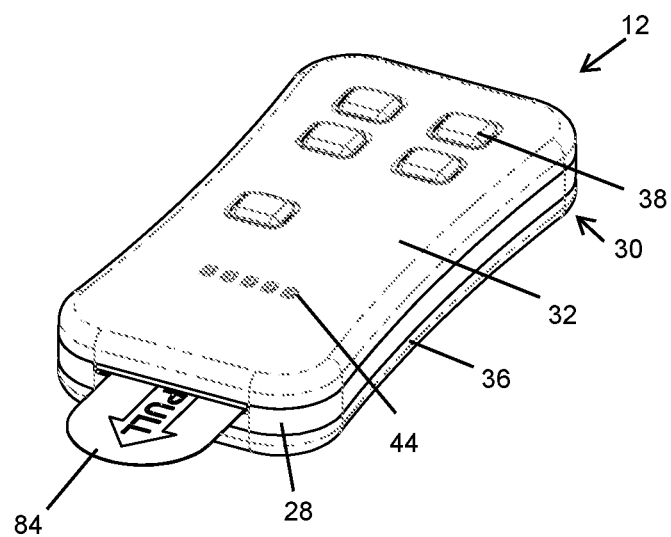
FIG. 11 is a front perspective view of the remote of FIG. 1; the view showing a remote control with a front side, a plurality of push buttons, a plurality of indicator lights, and a tab.
Figure 12:
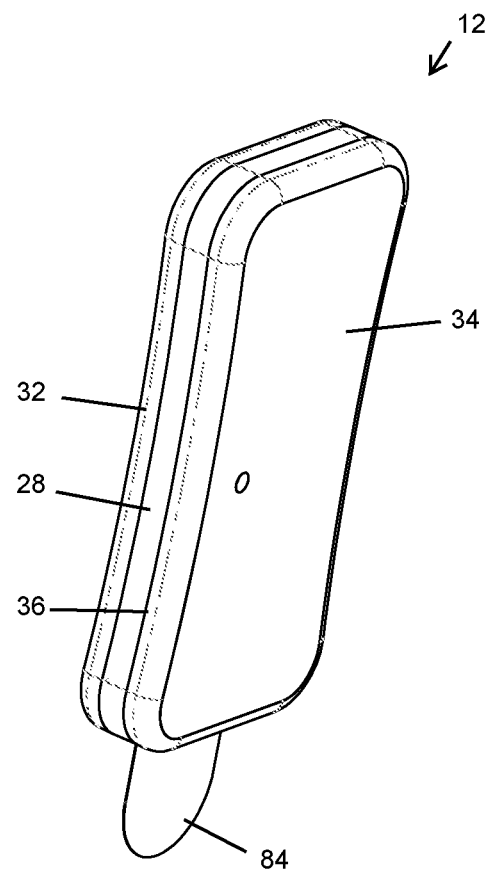
FIG. 12 is a rear, upper perspective view of the remote of FIG. 1; the view showing a remote control with a back side, a hole in the back side for access, and a tab.
Figure 13:
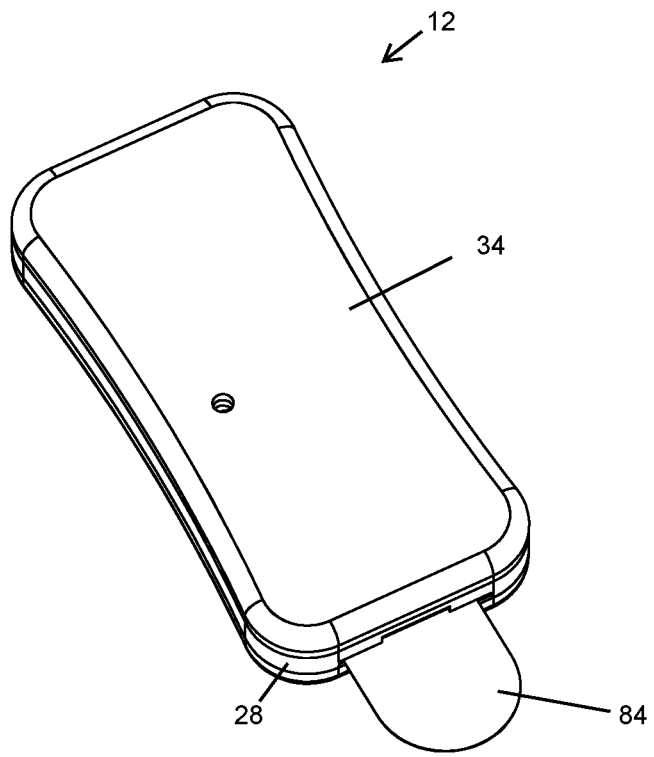
FIG. 13 is a rear, lower perspective view of the remote of FIG. 1; the view showing a remote control with a back side, a hole in the back side for access, and a tab.
Figure 14:
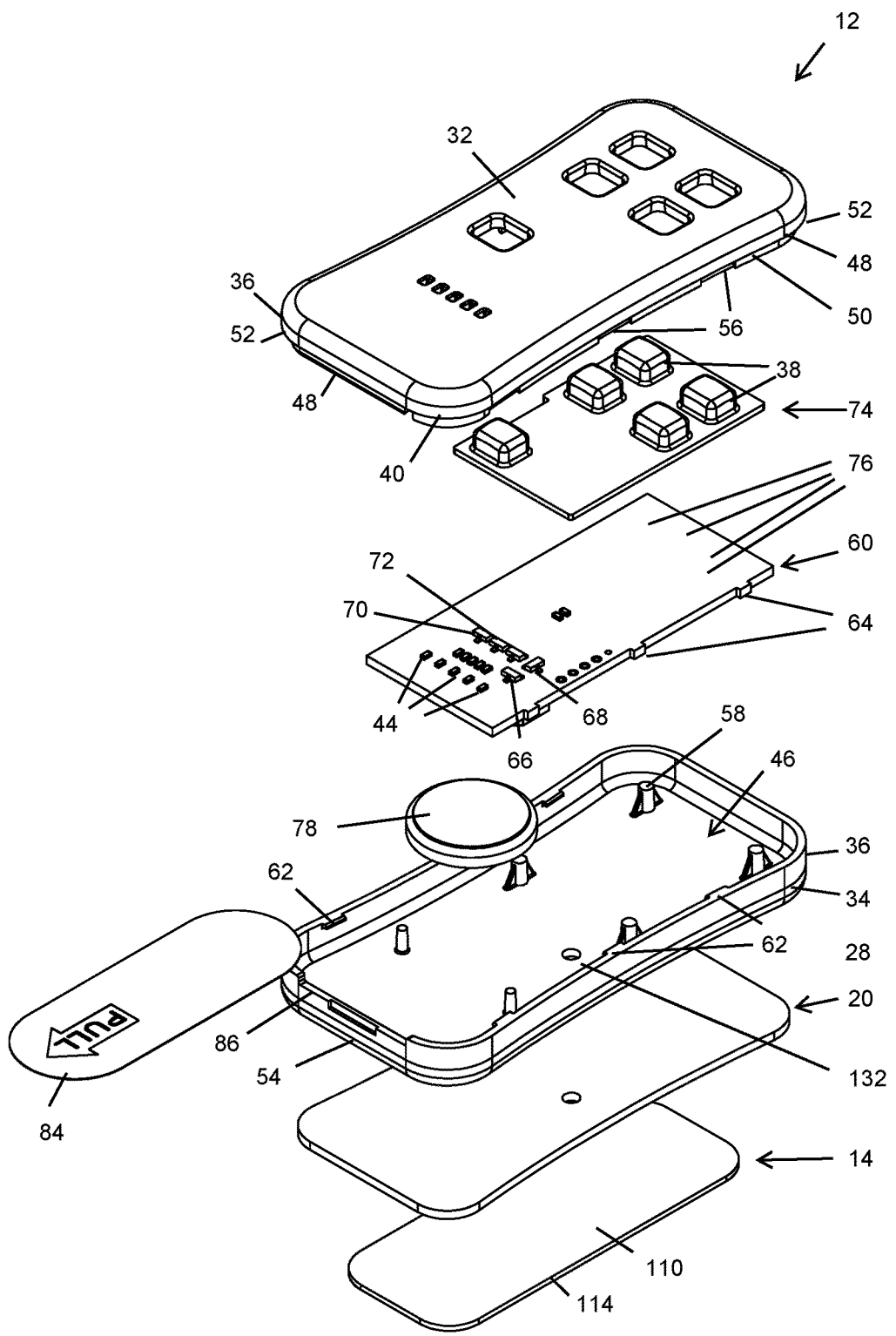
FIG. 14 is an exploded perspective view of the remote control of FIG. 1; the view showing a remote control with a front side, a back side, a plurality of push buttons, and a tab; the view also showing a PC board, a power supply, an attachment plate, and an adhering plate.
Figure 15:
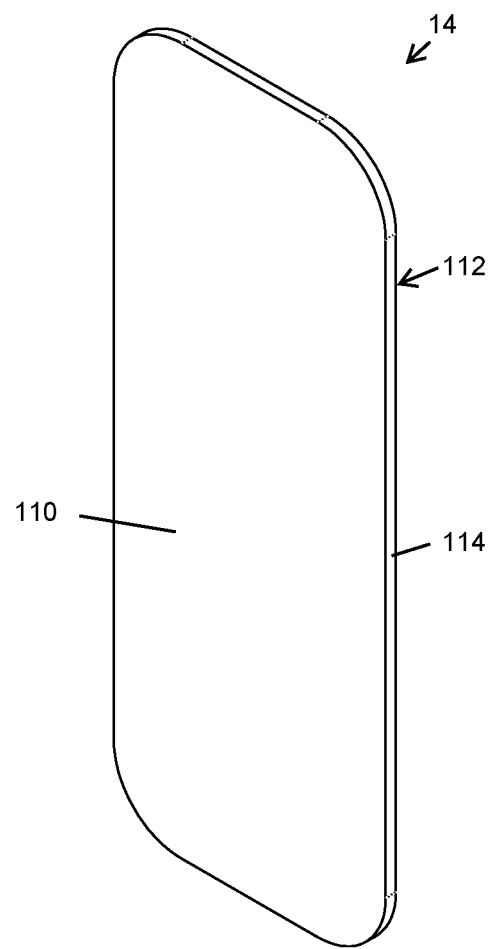
FIG. 15 is a perspective view of an adhering plate, the view showing the front side of the adhering plate that is planar in shape; the view showing an exterior peripheral edge of adhering plate which extends from the front, planar side of adhering plate to the back, planar side of adhering plate.
Figure 16:
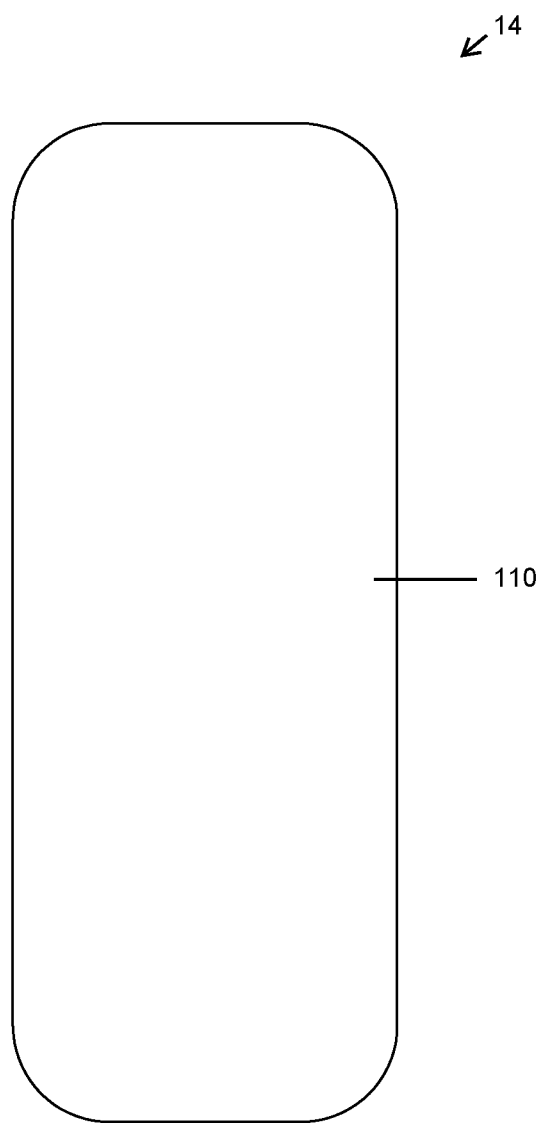
FIG. 16 is a front elevation view of an adhering plate, the view showing the front side of the adhering plate that is rectangular in shape with rounded corners.
Figure 17:
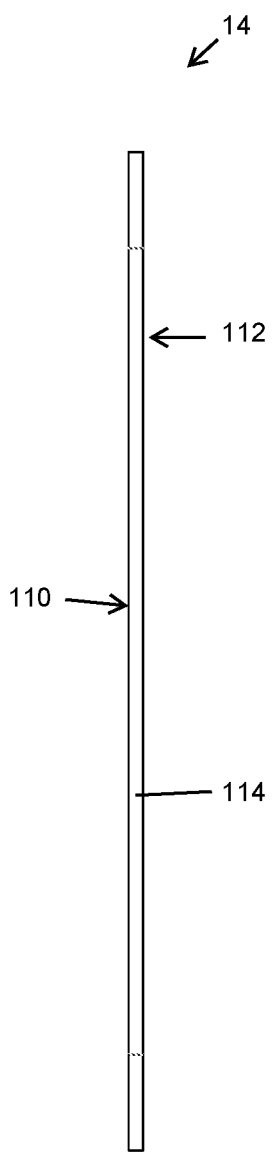
FIG. 17 is a side elevation view of an adhering plate, the view showing the side of the adhering plate which appears as an elongated vertical rectangle with a generally flat front side and a generally flat rear side.
Figure 18:
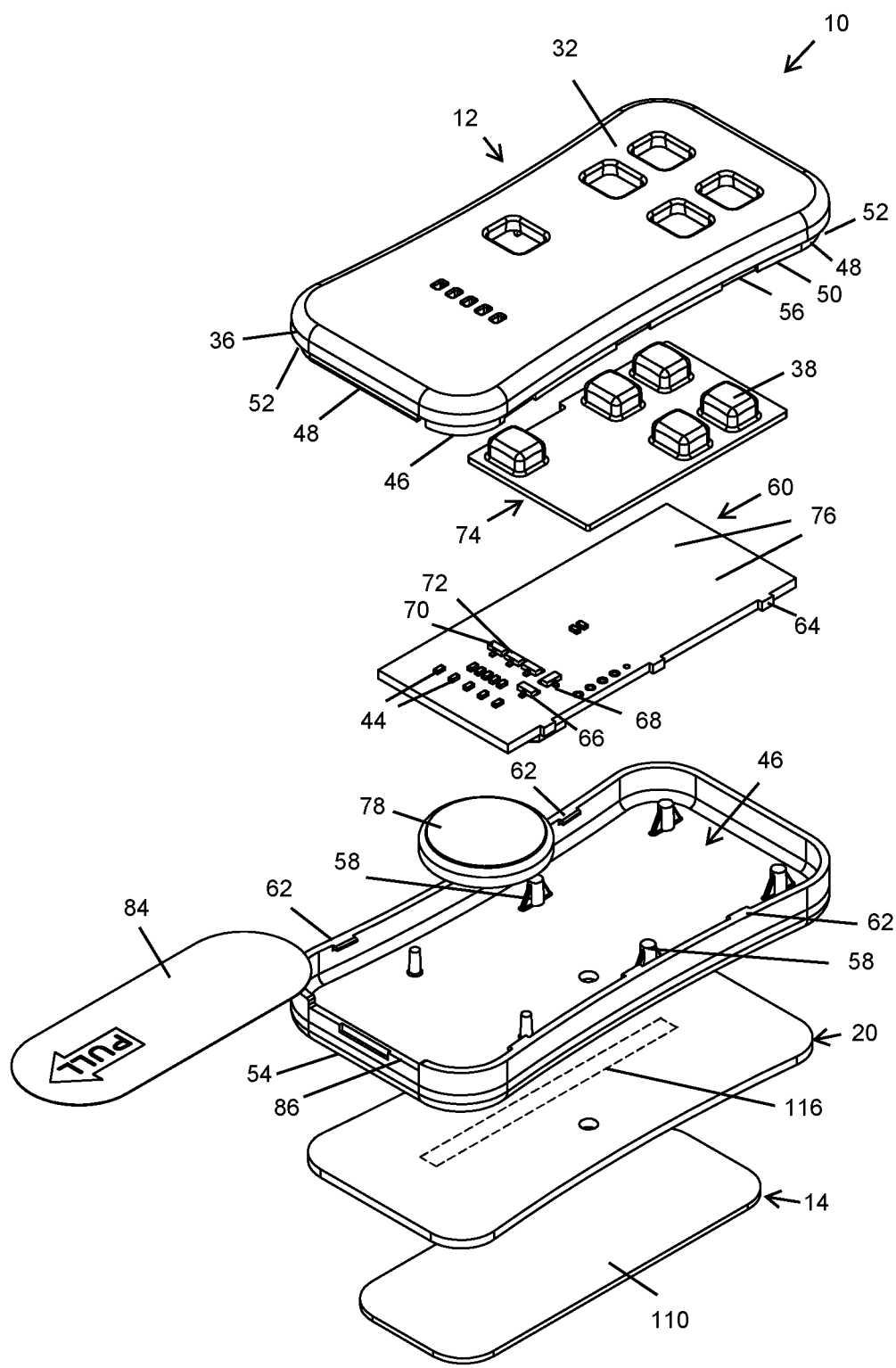
FIG. 18 is an exploded perspective view of the remote control of FIG. 1; the view showing a remote control with a front side, a back side, a plurality of push buttons, a hollow interior, and a tab; the view also showing, a PC board, a power supply, an attachment plate with a magnetic member, and an adhering plate.
Figure 19:
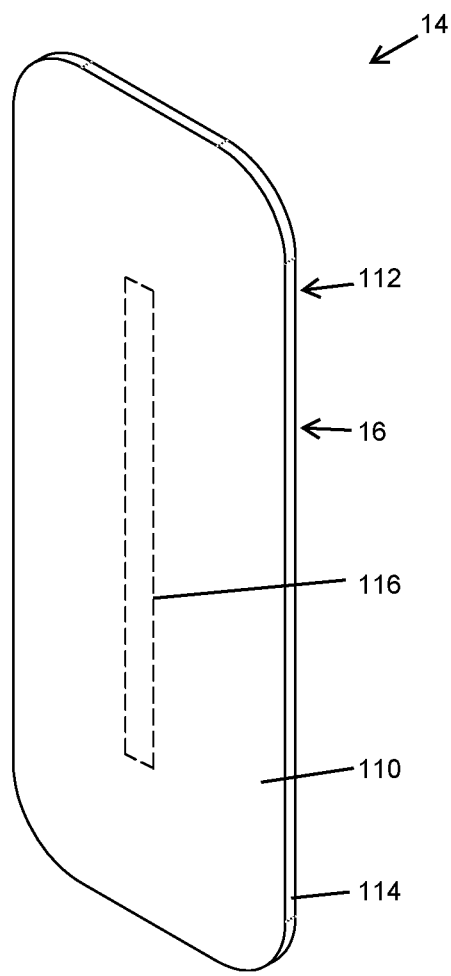
FIG. 19 is a perspective view of an adhering plate, the view showing the front side of the adhering plate that is planar and rectangular in shape; the view showing an exterior peripheral edge of adhering plate which extends from the front, planar side of adhering plate to the back, planar side of adhering plate; the view showing the adhering plate having a magnetic section.
Figure 20:
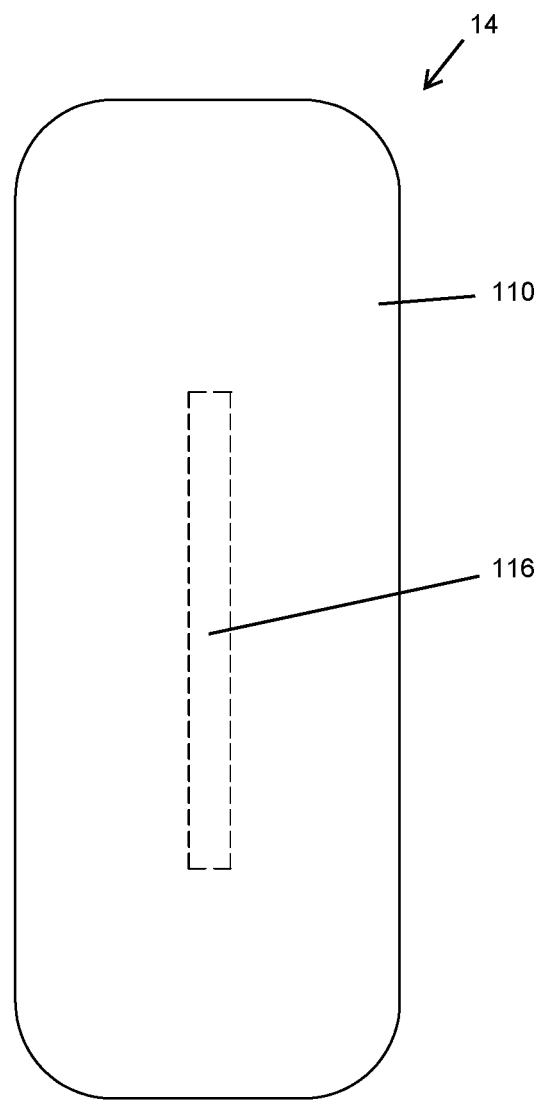
FIG. 20 is a front elevation view of an adhering plate, the view showing the front side of the adhering plate that is rectangular in shape, the view showing the adhering plate having a magnetic section which is laterally centered.
Figure 21:
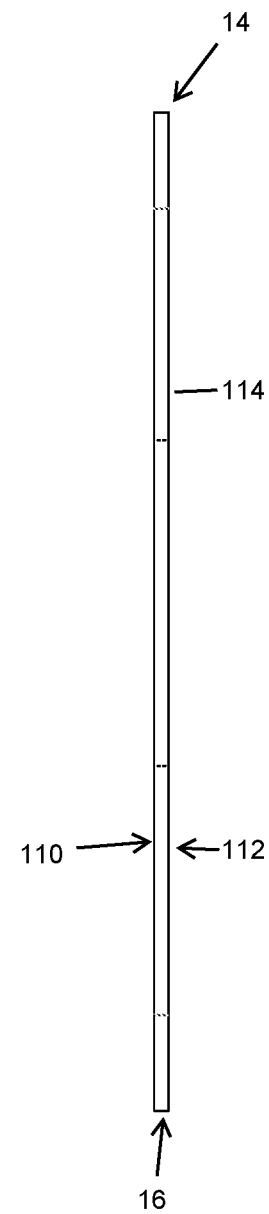
FIG. 21 is a side elevation view of an adhering plate, the view showing an exterior peripheral edge of adhering plate which extends from the front, planar side of adhering plate to the back, planar side of adhering plate.
Figure 22:
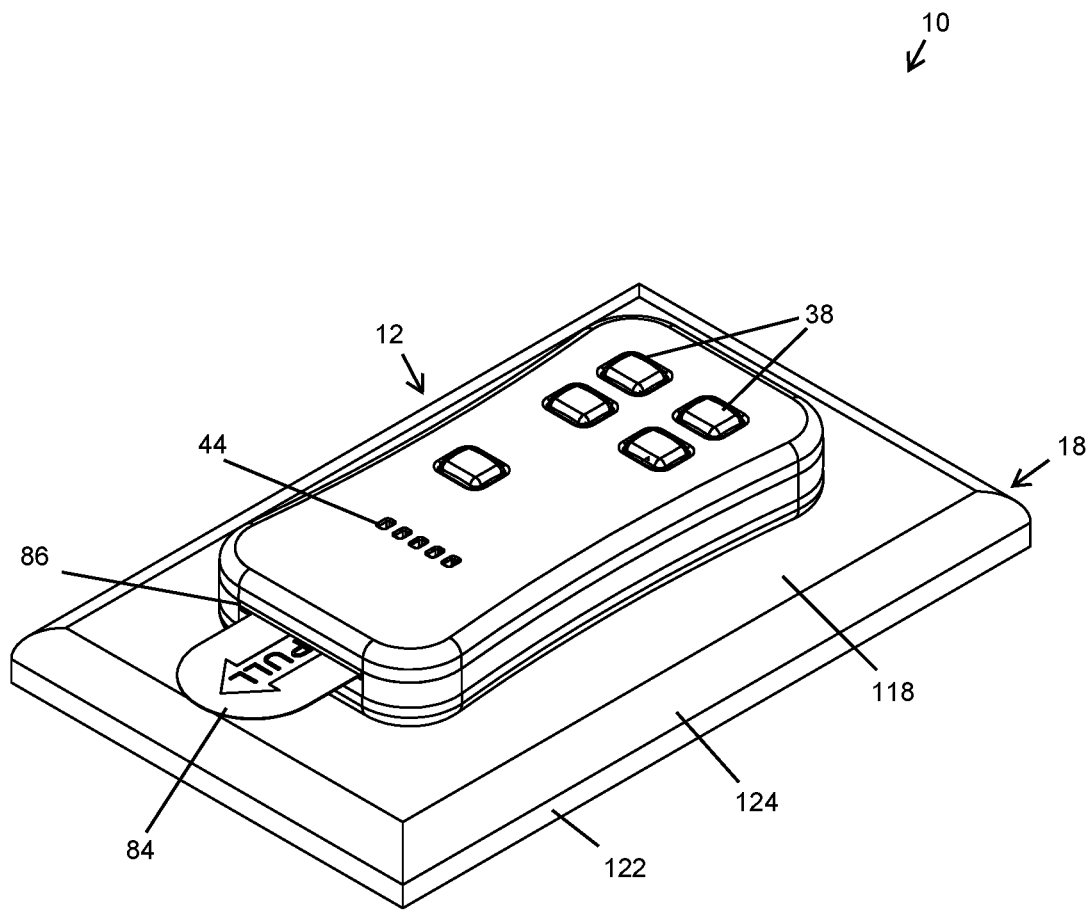
FIG. 22 is a front perspective view of the remote control of FIG. 1 and a mounting plate; the view showing a remote control with a front side, a back side, and a seam line between the front side and the back side, a plurality of push buttons, a plurality of indicator lights, and a tab; the view showing a mounting plate having a front side, an exterior peripheral edge, and a beveled edge.
Figure 23:
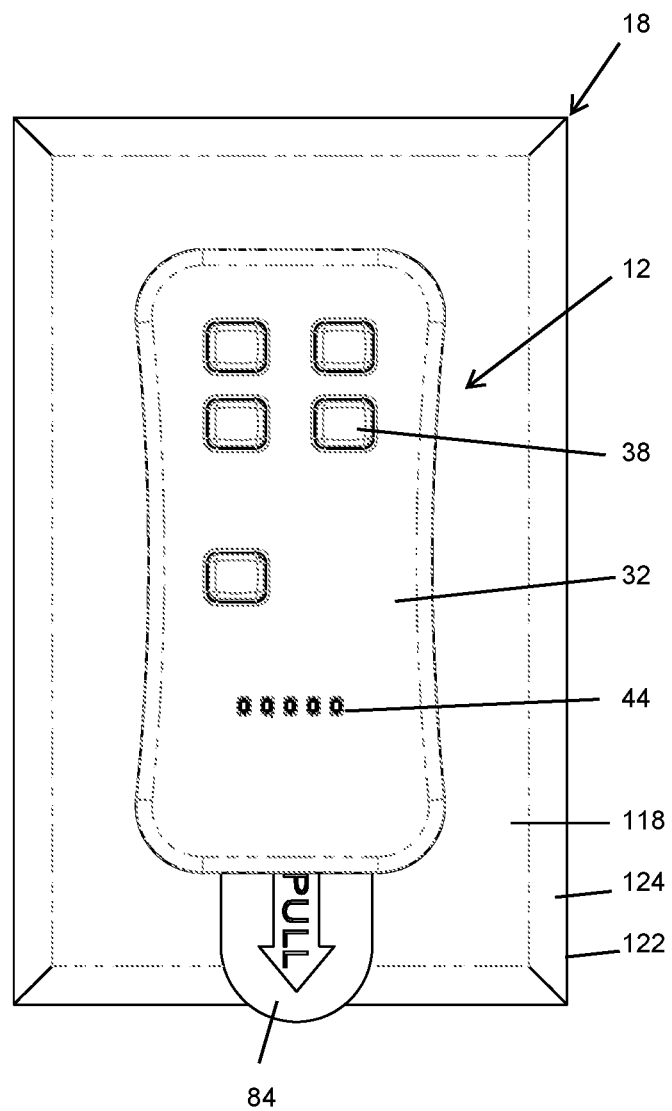
FIG. 23 is a front elevation view of the remote control of FIG. 1 and a mounting plate; the view showing a remote control with a front side, a plurality of push buttons, a plurality of indicator lights, and a tab; the view showing a mounting plate having a front side and a beveled edge.
Figure 24:
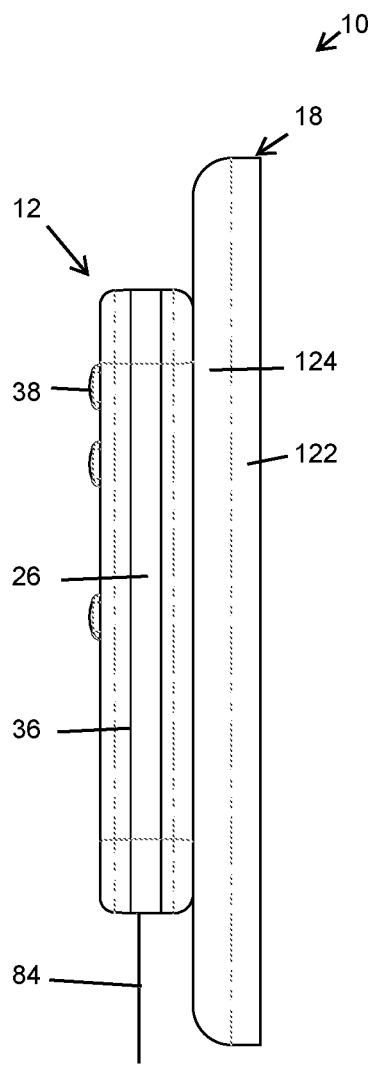
FIG. 24 is a side elevation view of the remote control of FIG. 1 and a mounting plate; the view showing a remote control with a front side, a back side, and a seam line between the front side and the back side, a plurality of push buttons, and a tab; the view showing a mounting plate having an exterior peripheral edge, and a beveled edge.
Figure 25:
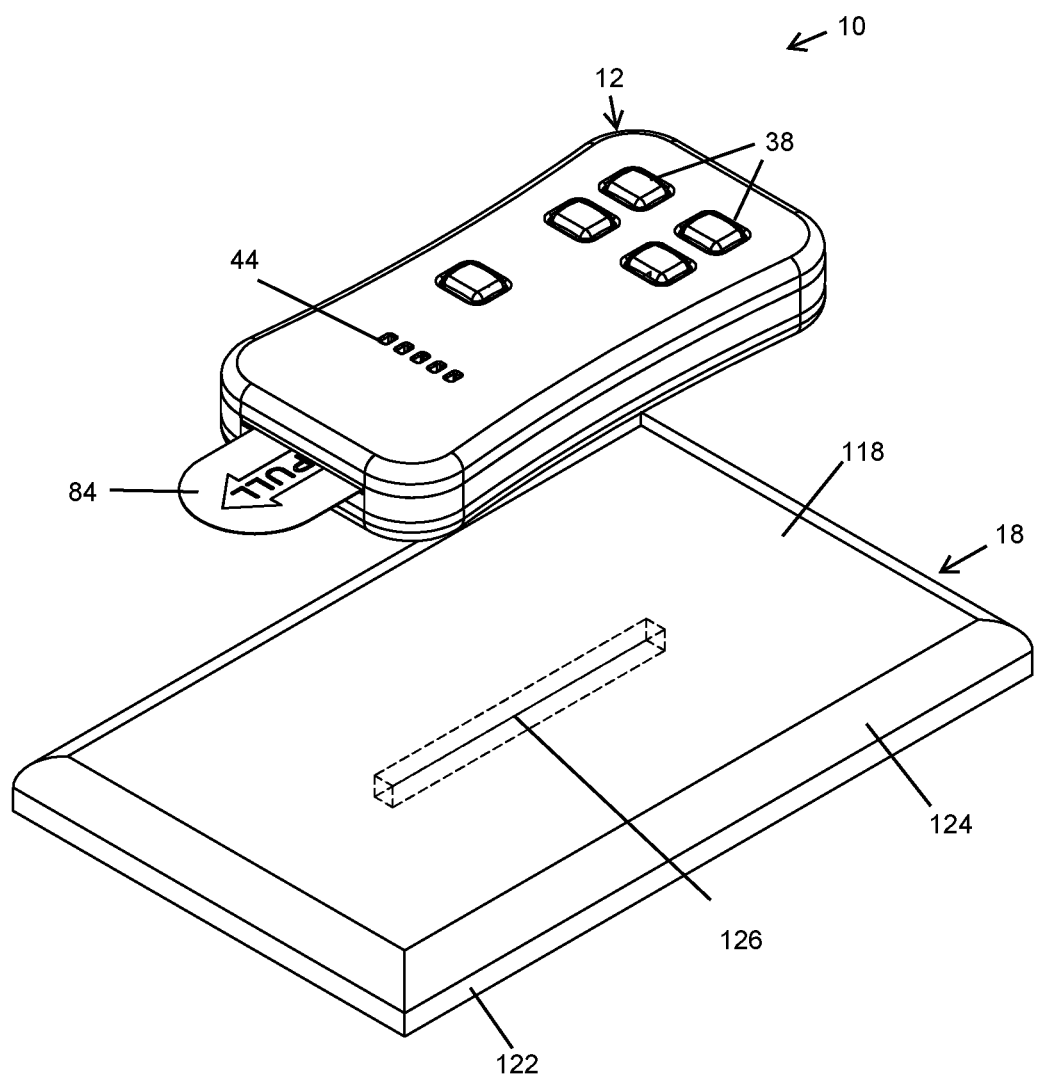
FIG. 25 is a front, partially exploded perspective view of the remote control of FIG. 1 and mounting plate; the view showing a remote control with a front side, a back side, and a seam line between the front side and the back side, a plurality of push buttons, a plurality of indicator lights, and a tab; the view showing a mounting plate having a front side, an exterior peripheral edge, a beveled edge, and a magnetic piece.
Figure 26:
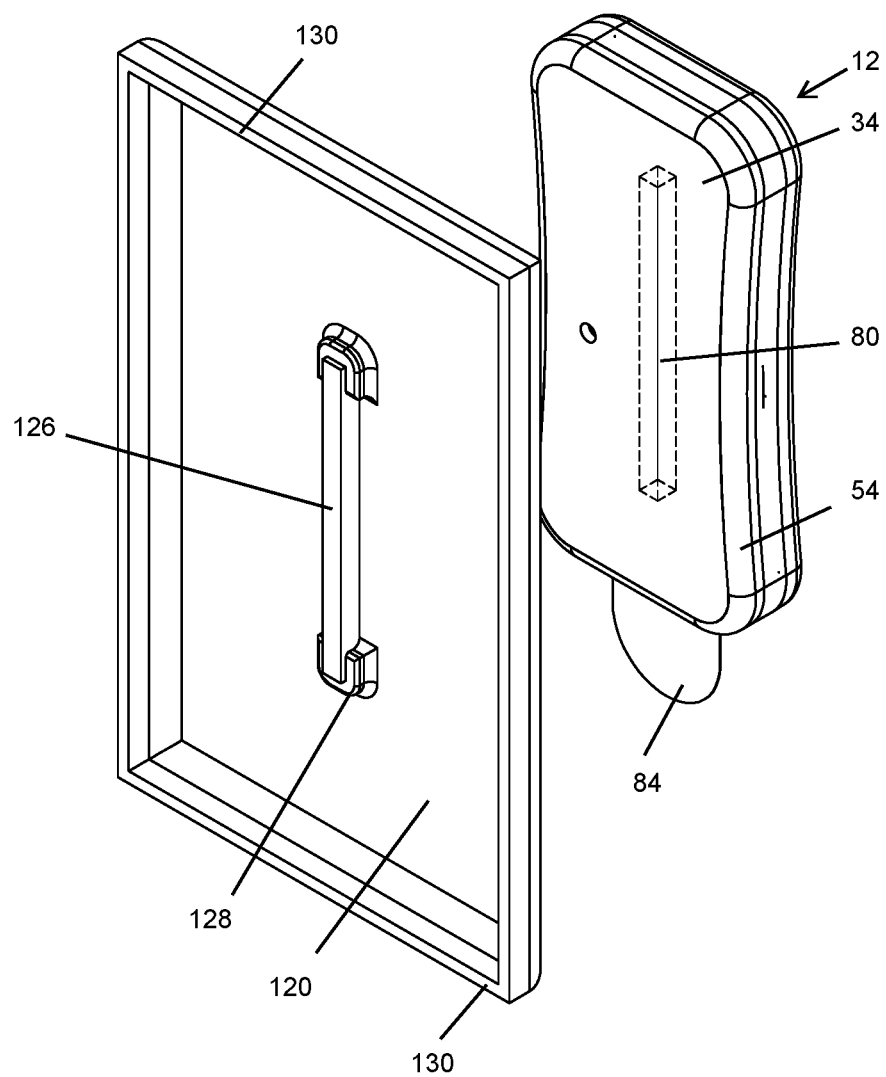
FIG. 26 is a back, partially exploded perspective view of the remote control of FIG. 1 and mounting plate; the view showing a remote control with a front side, a back side, and a seam line between the front side and the back side, a tab, and a magnetic member; the view showing a mounting plate having a back side, an exterior peripheral edge, a beveled edge and a magnetic member.

Remote control 12 is well suited to control one or more window coverings 24 that open and close such as roller shades, Venetian shades, honeycomb shades 100, or the like. Additionally, remote control 12 is well suited to control window coverings 24, in combination with other equipment. As one example of a window covering 24, which remote control 12 can control, a honeycomb shade 100 is shown in FIG. 2. Honeycomb shade 100 includes a header 102, a bottom bar 104, and a shade material 106 which extends between the header 102 and the bottom bar 104. Honeycomb shade 100 is shown in a closed position and remote control 12 is used to control the vertical position of the bottom bar 104.

As another example, remote control 12 is also well suited for a drapery 90. Drapery 90 includes a support member 92 connected adjacent its ends to support brackets 94. A blackout curtain 96 and shear curtain 98 hang down from support member 92. Blackout curtain 96 and shear curtain 98 slidably move along the length of support member 92 between an open and closed position. While drapery 90 shown in FIG. 1 opens and closes from one side, in an alternative arrangement, drapery 90 is center opening or closing. All of these arrangements of a drapery 90, as well as a honeycomb shade 100 are well suited for the functionality of remote control 12.

Assembly of Remote Control: Front side 32 and back side 34 of remote control 12 connect together in a clamshell-like fashion along seam line 36 therebetween. In this way, front side 32 and back side 34 form a hollow interior 46 there between in which other components of remote control 12 are housed. In one arrangement, as is shown, front side 32 and back side 34 are connected to one another by a snapping arrangement and/or a snap fit arrangement. However, any other means known in the art for connecting two components together are hereby contemplated for use such as bolting, screwing, snapping, welding, adhesives, and/or the like or any combination thereof.

In one arrangement, as is shown, to facilitate connection of front side 32 and back side 34 to one another, a plurality of snap features 48 are positioned along an overlapping flange 50 which extends inwardly towards back side 34 from the exterior periphery of front side 32. Flange 50 is positioned inward from step 52 in the exterior peripheral edge 28 of front side 32 which extends around the entire periphery of front side 32. Snap features 48 of front side 32 are aligned with and snap in the inside surface of exterior peripheral edge 54 of back side 34. Exterior peripheral edge 54 extends around the periphery of back side 34 and extends toward front side 32. In one arrangement, snap features 48 in front side 32 are deflectable hook members protruding outwardly from flange 50, whereas snap features 48 in the exterior peripheral edge 54 of back side 34 are recesses sized and shaped to lockingly receive and hold the snap features 48 of front side 32. However any other configuration or arrangement is hereby contemplated for use to connect front side 32 and back side 34.

A PC board 60 is positioned between and held in place by front side 32 and back side 34. PC board 60 is formed of any suitable size, shape and design. In one arrangement, as is shown, PC board 60 is a generally rectangular shaped member which takes up the majority of the side to side and top to bottom area within hollow interior 46. PC board 60 is generally planar in shape having a thin cross section.

PC Board 60 is positioned behind button plate 74 which is configured to connect to and hold the plurality of push buttons 38 in place with respect to one another. PC board 60 includes a plurality of sensors 76 that are configured to detect user interaction with plurality of push buttons 38 and/or the capacitive touch screen 40. Plurality of sensors 76 are positioned on the front face of PC board 60 and are aligned behind each of the push buttons 38. Alternatively, plurality of sensors 76 are positioned to detect accurate capacitive touch screen 40 data. With respect to the plurality of push buttons 38, only a single sensor 76 is associated with each push button 38. With respect to the capacitive touch screen 40, a plurality of capacitive screen sensors 42 detect proximity of small voltages being transferred to the screen, and in turn, the capacitive screen sensors 42 relay this information to the PC board 60.

One manner of holding PC board 60 between front side 32 and back side 34 is by closely and tightly sizing and shaping PC board 60 to fit therein such that when the front side 32 and back side 34 are connected to one another, thus PC board 60 is lockingly sandwiched there between in tight frictional engagement.

To provide further strength, rigidity and robustness to the design of remote control 12, a plurality of tabs 62 protrude out of the periphery of back side 34 and into the hollow interior 46 of back side 34. These tabs 62 are received within openings 56 positioned within flange 50 of the front side 32, or alternatively openings 56 are positioned within the exterior peripheral edge 54 of the back side 34. In the arrangement shown, as one example, a plurality of connectors 64 extend outward from the edges of PC board 60. These connectors 64 are configured to be received within openings in the front side 32 and/or back side 34 of remote control 12 and are configured to locate the PC board 60 precisely within the hollow interior 46 of remote control 12.

In the arrangement shown, as one example, when connectors 64 are held in place in and/or in between front side 32 and/or back side 34, the back side of PC board 60 sits on or rests upon a plurality of rests 58 that extend forward from the rear wall of back side 34 thereby holding PC board 60 in the proper position within hollow interior 46. The support provided by rests 58 also adds rigidity to PC board 60 which helps to prevent PC board 60 from flexing when the plurality of push buttons 38 is pressed. This provides a more solid feel and helps to ensure that when a button 38 is pressed the associated sensor 76 is activated.

PC board 60 includes all the necessary componentry to operate remote control 12, including a receiver or transceiver 66, an antenna 68, a microprocessor 70, memory 72 and any other component needed, all of which is electrically connected through and supported by PC board 60. A power supply 78 is also connected to PC board 60 that is held within the hollow interior 46 of remote control 12. In one arrangement, as is shown, power supply 78 is a battery, however any other form of power is hereby contemplated such as a solar cell or the like.

Magnetic Member: In one arrangement, a magnetic member 80 is positioned within hollow interior 46 of remote control 12. Magnetic member 80 may be formed of any suitable size, shape and design and is configured facilitate magnetic connection as well as alignment and orientation to an adhering plate 14. In one arrangement, magnetic member 80 is a generally elongated rectangular member that is positioned within the hollow interior 46 of remote control 12 and extends a length parallel to the length of remote control 12 equally spaced between sides of the remote control 12 and extending all the way or most of the way between the ends of the remote control 12. In one arrangement, magnetic member 80 is sized and shaped to be received within a magnetic member recess positioned within the interior surface of back side 34 of remote control 12. In this arrangement, magnetic member 80 is prevented from escaping from the magnetic member recess once PC board 60 is snapped into place on rests 58. In an alternative arrangement, magnetic member 80 is formed within the material of back side 34, thereby permanently preventing the escape of magnetic member 80, short of breaking the back side 34.

In an alternative arrangement, magnetic member 80 may be formed of any other shape. In one arrangement, magnetic member 80 may cover most if not all of the surface area of the interior or exterior of back side 34 of remote control 12.

Magnetic member 80 may be formed of a single magnet having one side having a positive or south pole and the opposite side having a negative or north pole. This dipole arrangement may be used for self-orienting and self-centering as is further described herein.

Pull Tab: In the arrangement shown, as one example, remote control 12 includes a pull tab 84. Pull tab 84 is formed of any suitable size, shape and design and is configured to activate remote control 12 after remote control 12 and corresponding equipment are ready for operation. Pull tab 84 rests between power supply 78 and the PC board 60 from the time of manufacturing to the first time the device is to be used on the consumer end. Pull tab 84 creates a block between power supply 78 and PC board 60 which serves to preserve the supply of power supply 78, until power supply 78 is needed. Additionally, remote control 12 includes a slot 86. Slot 86 is formed of any suitable size, shape and design and is configured to provide a slim and slender pathway from the outside of remote control 12 to the hollow interior 46 so the pull tab 84 is able to be presented to the user on the exterior of remote control 12 while still facilitating as a block between power supply 78 and the PC board 60.

Adhering Plate:

System 10 includes an adhering plate 14. Adhering plate 14 is formed of any suitable size, shape and design and is configured to attach to a wall 22, by adhesives, fasteners, or the like, while facilitating magnetic attachment of remote control 12 to wall 22 while also providing alignment and orientation of remote control 12 to adhering plate 14. In one arrangement, as is shown, adhering plate 14 has a front side 110, a back side 112, an exterior peripheral edge 114, and a magnetic section 116. Notably, magnetic section 116 may take up only a portion of adhering plate 114, as is shown in the dashed lines, or alternatively magnetic section 116 may take up most if not all of the adhering plate 14.

In the arrangement shown, as one example, front side 110 is generally flat and flush and designed to flushly receive the back side 34 of remote control 12 in planar face-to-face engagement. Similarly, in the arrangement shown, as one example, back side 112 is generally flat and flush and designed to flushly receive and engage the surface of wall 22 in planar face-to-face engagement. In the arrangement shown, as one example, exterior peripheral edge 114 of adhering plate 14 is slightly smaller when measured around the perimeter than the exterior peripheral edge 28 of remote control 12, so that when remote control 12 is magnetically engaged with adhering plate 14, adhering plate 14 is completely hidden or concealed behind remote control 12. That is, said another way, the exterior peripheral edge 114 of adhering plate 14 has the same or simplar shape as exterior peripheral edge 28 of remote control 12 only slightly smaller such that when the remote control 12 is placed over the adhering plate 14 the entirety of the exterior peripheral edge 114 of adhering plate 14 is positioned within the exterior peripheral edge 28 of remote control 12 thereby completely concealing the adhering plate 14 behind the remote control 12 when viewing the remote control 12 from the front.

In the arrangement shown, as one example, adhering plate 14 includes at least one magnetic section 116. Magnetic section 116 is formed of any suitable size, shape and design and is configured to magnetically attach remote control 12 to adhering plate 14 as well as provide automatic self-centering and self-orientation. Magnetic section 116 may be formed of a single member of a magnet which is similarly sized and shaped to magnetic member 80 of remote control 12. In another arrangement, magnetic section 116 may be formed of a plurality of dipole magnets strategically incorporated into adhering plate 14. In another arrangement, magnetic section 116 may cover the entire surface area of front side 110 of adhering plate 14. In one arrangement, magnetic section 116 is seamlessly positioned within the planes of the front side 110 and back side 112 of adhering plate 14 such that the magnetic section 116 is effectively seamless or unnoticeable within the planar shaped adhering plate 14. Furthermore, magnetic section 116 may be incorporated into adhering plate 14 or may be attached to adhering plate 14 by an adhesive or other manner. In the arrangement shown, as one example, magnetic section 116 is incorporated into adhering plate 14 such that the assembly of adhering plate 14 prevents magnetic section 116 from escaping or separating, short of breaking adhering plate 14. Any other arrangement is hereby contemplated for use as magnetic section 116 that is configured to successfully magnetically attach remote control 12 to adhering plate 14.

In the arrangement shown, as one example, magnetic section 116 is positioned in alignment with magnetic member 80 of remote control 12. In this way, magnetic section 116 and magnetic member 80 provide a strong attractive force which holds remote control 12 in planar, flush alignment with adhering plate 14, while remote control 12 completely conceals adhering plate 14 behind remote control 12. Furthermore, this alignment practically eliminates the possibility that remote control 12 will ever unintentionally dislodge from adhering plate 14 due to the strength of the magnetic attraction. In addition, this arrangement helps facilitate self-centering and self-orienting of remote control 12 with adhering plate 14.

In the arrangement shown as one example, magnetic section 116 of adhering plate 14 is laterally centered on adhering plate 14. Furthermore, in the arrangement shown, as one example, magnetic member 80 of remote control 12 is laterally centered within remote control 12. This arrangement of the two magnetic features ensures that remote control 12 will be in overlapping and centered alignment with adhering plate 14 so that remote control 12 completely conceals adhering plate 14.

Furthermore, this arrangement of the two magnetic features ensures that remote control 12 will be self-orienting as well as self-centering with relation to adhering plate 14. In the arrangement shown, as one example, magnetic member 80 of remote control 12 is a dipole magnet wherein one end of the magnet is a north pole and the opposite end of the magnet is a south pole. Magnetic section 116 of adhering plate 14 is similarly arranged wherein one end of the magnet is a north pole and the opposite end of the magnet is a south pole. Care is taken when assembling magnetic member 80 into remote control 12 as well as when installing adhering plate 16 to ensure the proper orientation of remote control 12 when remote control 12 is installed onto adhering plate 14.

In this arrangement, when magnetic member 80 is installed properly into remote control 12 and adhering plate 14 is properly installed on wall 22, when remote control 12 is placed within magnetically attracting proximity to adhering plate 14, the magnetic member 80 of remote control 12 will automatically magnetically attract to the magnetic section 116 of adhering plate 14 and remote control 12 will automatically self-orient as well as self-center on adhering plate 14. That is, when remote control 12 is placed on adhering plate 14, remote control 12 will self-orient meaning that remote control 12 will spin in a clockwise or counter-clockwise direction to align the magnetic member 80 of remote control 12 with the magnetic section 116 of adhering plate 14. Similarly, when remote control 12 is placed on adhering plate, remote control 12 will self-center, meaning that remote control 12 will move vertically and/or laterally to precisely align the magnetic member 80 of remote control 12 with the magnetic section 116 of adhering plate 14. In this way, the system 10 ensures the remote control 12, when installed on the adhering plate 14 is always pointed up (or any other desired direction) and is centered on the adhering plate 14, thereby concealing the slightly smaller adhering plate 14. Not only is this predictable arrangement functionally pleasing to the user because the remote control 12 will always be in the same orientation, this arrangement is aesthetically pleasing as it maintains whatever orientation the user wants and helps to eliminate misaligned remote controls 12.

Also, in the arrangement shown, as one example, a durable arrangement is presented because a layer of material is positioned between magnetic section 116 of adhering plate 14 and magnetic member 80 of remote control 12 when they magnetically connect to one another. That is, the back side 34 of remote control 12 is positioned between magnetic member 80 of remote control 12 and magnetic section 116 of adhering plate 14. This layer helps to attenuate some of the magnetic attraction by preventing direct magnet-on-magnet connection, which allows for easier removal while still providing a strong magnetic hold. This arrangement provides for a more durable design.

In the arrangement shown, as one example, adhering plate 14 is completely concealed behind remote control 12 when remote control 12 is in place on adhering plate 14. This is a unique feature because it provides the user with a clear and easy path to grabbing remote control 12. The user is able to easily grab the exterior peripheral edge 28 of remote control 12 without obstructions from a surrounding bezel, holder or other structure. This arrangement does not limit the ways in which the remote 12 may be removed from the adhering plate 16. That is, this arrangement allows for a user to pull remote control 12 out of magnetic engagement with adhering plate 14, by pulling either directly away from adhering plate 14 or by sliding remote control 12 in a lateral, vertical or angular movement to easily break the magnetic attraction. This arrangement is advantageous because it allows the user to remove remote control 12 with a variety of actions and with great ease.

One of the substantial benefits of adhering plate 14 is that it can be attached anywhere but also it is extremely low-profile due to its small surface area (compared to conventional bezels) and thin depth or thickness. As such, it can be installed practically anywhere and its low-profile nature makes the adhering plate 14 practically unnoticeable once installed. In addition, to better hid the adhering plate 14 once installed, adhering plate 14 may be painted over, or alternatively a sticker, which may have the same color as the wall or trim, can be placed over the surface of adhering plate 14 to conceal its appearance and to make adhering plate 14 blend into the surrounding wall 22 or environment. In one arrangement, adhering plate 14 has a surface treatment that accepts being painted well, such as a roughened or textured surface.

Attachment Plate: In an alternative embodiment to remote control 12 including a magnetic member 80 positioned within the hollow interior 46 of remote control 12, system 10 include an attachment plate 20. Attachment plate 20 is formed of any suitable size, shape and design and is configured to attach to the interior or exterior of the back side 34 of remote control 12 and facilitate magnetic attachment, as well as self-centering and self-orienting of remote control 12 to adhering plate 14.

In the arrangement shown, as one example, attachment plate 20 is a generally planar member with an exterior peripheral edge that approximately matches, or is slightly smaller than, the exterior peripheral edge 28 of remote control 12, when attachment plate 20 is attached to the exterior of the back side 34 of remote control 12. In this arrangement, when attachment plate 20 is attached to the back side 34 of remote control 12 the attachment plate 20 is flush with or slightly recessed to the exterior peripheral edge of the remote control 12.

Alternatively, when attachment plate 20 is positioned within the hollow interior 46 of remote control 12, the exterior peripheral edge of adhering plate 20 approximately matches, or is slightly smaller than, the interior peripheral edge of the back side 34 of remote control 12. In this arrangement, attachment plate 20 is configured to fit within the hollow interior of the back side 34 of remote control 12 with close and tight tolerances.

In the arrangement shown, once installed on remote control 12, whether on the inside or the outside of back side 34, attachment plate 20 covers all or most of the surface area of the back side 34 of remote control 12. In one arrangement, a hole 132 is present that allows for access to the back side of PC board 60 for programming purposes. This hole 132 allows for the insertion of the end of a pin or paperclip to facilitate programming of the remote control 12. This hole 132 may be present in the back side of remote control 12 as well as any covering attachment plate 20

In the arrangement shown, as one example, attachment plate 20 includes at least one magnetic section 116. Magnetic section 116 is formed of any suitable size, shape and design and is configured to magnetically attach remote control 12 to adhering plate 14 as well as provide self-centering and self-orientation. Magnetic section 116 may be formed of a single member of a magnet which is similarly sized to magnetic section 116 of adhering plate. In another arrangement, magnetic section 116 may be formed of a plurality of dipole magnets strategically incorporated into attachment plate 20. In another arrangement, magnetic section 116 may cover the entire surface of attachment plate 20. In one arrangement, magnetic section 116 is seamlessly positioned within the planes of the front side and back side of attachment plate 20 such that the magnetic section 116 is effectively seamless or unnoticeable within the planar shaped attachment plate 20. Furthermore, magnetic section 116 may be incorporated into attachment plate 20 or may be attached to attachment plate 20 by an adhesive or other manner. In the arrangement shown, as one example, magnetic section 116 is incorporated into attachment plate 20 such that the assembly of attachment plate 20 prevents magnetic section 116 from escaping, short of breaking attachment plate 20. Any other arrangement is hereby contemplated for use as magnetic section 116 of attachment plate 20 that is configured to successfully magnetically attach remote control 12 to adhering plate 14.

In the arrangement shown, as one example, magnetic section 116 of attachment plate 20 is positioned in alignment with section of adhering plate 60. In this way, magnetic section 116 of adhering plate 14 and magnetic section 116 of attachment plate 20 provide a strong attractive force which holds remote control 12 in planar, flush alignment with adhering plate 14, while remote control 12 completely conceals adhering plate 14. Furthermore, this alignment practically eliminates the possibility that remote control 12 will ever unintentionally dislodge from adhering plate 14 due to the strength of the magnetic attraction. In addition, this arrangement helps facilitate self-centering and self-orienting of remote control 12 with adhering plate 14.

In the arrangement shown as one example, magnetic section 116 of adhering plate 14 is laterally centered on adhering plate 14. Furthermore, in the arrangement shown, as one example, magnetic section 116 of attachment plate 20 of remote control 12 is laterally centered within remote control 12. This arrangement of the two magnetic features ensures that remote control 12 will be in overlapping and centered alignment with adhering plate 14 so that remote control 12 completely conceals adhering plate 14.

Furthermore, this arrangement of the two magnetic features ensures that remote control 12 will be self-orienting as well as self-centering with relation to adhering plate 14. In the arrangement shown, as one example, magnetic section of attachment plate 20 of remote control 12 is a dipole magnet wherein one end of the magnet is a north pole and the opposite end of the magnet is a south pole. Magnetic section 116 of adhering plate 14 is similarly arranged wherein one end of the magnet is a north pole and the opposite end of the magnet is a south pole. Care is taken when assembling attachment plate 20 onto remote control 12 as well as when installing adhering plate 16 to wall 22 to ensure the proper orientation of remote control 12 when remote control 12 is installed onto adhering plate 14. In this arrangement, when magnetic section 116 of attachment plate 20 is installed properly onto remote control 12 and adhering plate 14 is properly installed on wall 22, when remote control 12 is placed within magnetically attracting proximity to adhering plate 14, the magnetic section 116 of attachment plate 20 of remote control 12 will automatically magnetically attract to the magnetic section 116 of adhering plate 14 and remote control 12 will automatically self-orient as well as self-center on adhering plate 14. That is, when remote control 12 is placed on adhering plate 14, remote control 12 will self-orient meaning that remote control 12 will spin in a clockwise or counter-clockwise direction to align the magnetic section 116 of attachment plate 20 of remote control 12 with the magnetic section 116 of adhering plate 14. Similarly, when remote control 12 is placed on adhering plate 14, remote control 12 will self-center, meaning that remote control 12 will move vertically and/or laterally to precisely align the magnetic section 116 of attachment plate 20 of remote control 12 with the magnetic section 116 of adhering plate 14. In this way, the system 10 ensures the remote control 12, when installed on the adhering plate 14 is always pointed up (or any other desired direction) and is centered on the adhering plate 14, thereby concealing the slightly smaller adhering plate 14.

Adhesive:

System 10 includes an adhesive 16. Adhesive 16 is formed of any suitable size, shape, material and design and is configured to facilitate attaching adhering plate 14 to a wall 22 or other surface and/or facilitates attaching attachment plate 20 to remote control 12. In the arrangement shown, as one example, adhesive 16 covers the back side 112 of adhering plate 14 as well as the back side of attachment plate 20. In the arrangement shown, as one example, adhesive 16 forms an even coating across the entire back side 112 of adhering plate 14 in an even and consistent manner. In another arrangement, adhesive 16 may be applied on part of, or portions of, the back side 112 of adhering plate 14 and attachment plate 20.

In the arrangement shown, as one example, adhesive 16 includes a thin film or cover which is removed by a user just prior to installation. This prevents other items from sticking to adhesive 16 and/or adhesive 16 collecting dust or dirt which inhibits adhesion to the desired surface. Adhesive 16 may be formed of any glue, mucilage, paste, cement or other substance which is capable of binding the back side 112 of adhering plate 14 to wall 22 or other desired surface, as well as binding the back side of attachment plate 20 to remote control 12. In an alternative embodiment, adhesive 16 may not need a cover and may be an adhesive activated by a chemical reaction, thermal binding, and/or other binding techniques, so long as adhesive 16 is activated when adhering plate 14 is ready to be installed against a wall 22 or other surface.

In the arrangement shown, an adhesive 16 is used to attach adhering plate 14 to wall 22. The use of adhesive 16 has a significant advantage as opposed to bolting, screwing, nailing, sewing, mechanical fastening, or thermal bonding. Some of the advantages of using adhesive 16 include, but are not limited to: ease of installation; cost effectiveness; that no tools, or skills with tools, are required for installation; that an adhesive can bind to almost any surface no matter the material type; that the increased design flexibility contributes to aesthetic appeal; among many other advantages. In addition, using adhesive 16 to install adhering plate 14 to wall 22 may be very appealing to users who are not comfortable screwing, bolting or nailing into their walls, this is particularly true for younger users. In addition, using adhesive 16 to install adhering plate 14 allows adhering plate 14 to be installed in areas where screws, bolts or nails or other attachment means cannot be used or are undesirable to use, such as on glass, on brick or concrete walls, on metal frame members (such metal window frames), on trim, on furniture or on countless other hard or sensitive members.

Alternative Embodiment

In an alternative embodiment, as is shown, system 10 uses a mounting plate 18 in place of an adhering plate 14. Mounting plate 18 is formed of any suitable size, shape, and design and is configured to adhesively or otherwise attach to a wall 22 while magnetically attracting remote control 12. In the arrangement shown, as one example, mounting plate 18 may be attached to a wall 22 or other surface with a screw, nail, bolt, or other fastening member. Mounting plate 18 is configured to function similarly to the way adhering plate 14 functions, however, mounting plate 18 is not completely concealed behind remote 12 in the example shown. However, a completely concealed mounting plate 18 is hereby contemplated for use. Furthermore, while mounting plate 18 may have these features shown as an example, other embodiments of mounting plate 18 are hereby contemplated for use such a single monolithic mounting plate, an outlet cover style mounting plate, or other mounting plate arrangements or appearances.

In the arrangement shown, as one example, mounting plate 18 is roughly the size of a standard outlet wall plate. In the arrangement shown, as one example, mounting plate 18 is generally square or rectangular when viewed from the front. Mounting plate 18 has a front side 118, a back side 120, an exterior peripheral edge 122, a beveled edge 124, a magnetic piece 126, as well as a magnetic piece housing 128, and an adhesive edge 130.

In the arrangement shown, as one example, mounting plate 18 is generally flat and flush on the front side 118 of mounting plate 18 such that mounting plate 18 can receive remote control 12 in planar face-to-face engagement. As the front side 118 of mounting plate 18 does not include any feature, upon placement of the remote 12 onto the front side 118 of mounting plate 18, remote 12 is free to rotate to self-orient as well as being free to slide to shift to self-center.

In the arrangement shown, as one example, exterior peripheral edge 122 of mounting plate 18 is larger when measured around the perimeter than the exterior peripheral edge 28 of remote control 12, so that when remote control 12 is magnetically engaged with mounting plate 18, mounting plate 18 is not completely concealed. However, an arrangement where mounting plate 18 is completely concealed behind remote control 12 is hereby contemplated for use, whether that be by implementation of a larger remote control 12 or by implementation of a smaller mounting plate 18.

In the arrangement shown, as one example, mounting plate 18 includes a magnetic piece 126. Magnetic piece 126 is formed of any suitable size, shape and design and is configured to magnetically attach remote control 12 to mounting plate 18. Magnetic piece 126 may be formed of a single member of a magnet which is similarly sized to magnetic member 80 of remote control 12 and/or magnetic section 116 of attachment plate 20, so that the magnets of the two components function in harmony with one another to self-orient and to self-align. In another arrangement, magnetic piece 126 may be formed of a plurality of dipole magnets strategically incorporated into mounting plate 18.

In another arrangement, magnetic piece 126 may cover the entire back side 120 of mounting plate 18. Other magnetic piece 126 arrangements are hereby contemplated for, such that other configurations magnetically attach remote control 12 to mounting plate 18. Furthermore, magnetic piece 126 may be incorporated into mounting plate 18 or may be attached to the back side 120 of mounting plate 18 by a magnetic piece housing 128 that is configured to hold magnetic piece 126 to mounting plate 18. Either of these methods of incorporating magnetic piece 126 into mounting plate 18 are contemplated such that the assembly of mounting plate 18 and incorporation of magnetic piece 126 therein prevents magnetic piece 126 from escaping mounting plate 18.

In the arrangement shown, as one example, magnetic piece 126 is positioned in alignment with magnetic member 80 of remote control 12 and/or magnetic section 116 of attachment plate 20. In this way, magnetic attraction between magnetic piece 126 and magnetic member 80 provide a strong attractive force which holds remote control 12 in planar, flush alignment with the front side 118 of mounting plate 18. Furthermore, this alignment practically eliminates the possibility that remote control 12 will ever unintentionally dislodge from mounting plate 18. In addition, this arrangement helps facilitate self-centering and self-orienting of remote control 12 with mounting plate 18 in the manner described herein.

In the arrangement shown, as one example, magnetic piece 126 of mounting plate 18 is laterally centered on the back side 120 of mounting plate 18. Furthermore, in the arrangement shown, as one example, magnetic member 80 of remote control 12 is laterally centered within remote control 12 and magnetic section 116 of attachment plate 20 is laterally centered within remote control 12. This arrangement of the two magnetic components provides that remote control 12 will be in centered on mounting plate 18.

Furthermore, this arrangement of the two magnetic features ensures that remote control 12 will be self-orienting as well as self-centering with relation to mounting plate 18. In the arrangement shown, as one example, magnetic member 80 of remote control 12 and/or magnetic section 116 of attachment plate 20 is a dipole magnet wherein the one end of the magnet is a north pole and the other end of the magnet is a south pole. Similarly, magnetic piece 126 of mounting plate 18 is a dipole magnet wherein the one end of the magnet is a north pole and the other end of the magnet is a south pole. Care is taken when installing the magnetic piece 126 into mounting plate 18 as well as when installing mounting plate 18 onto wall 22 so as to ensure an opposite magnetic orientation to the magnetic member 80 of remote control 12 or to the magnetic section 116 of adhering plate 14. In this arrangement, when magnetic section 116 of attachment plate 20 or magnetic member 80 is installed properly onto remote control 12 and mounting plate 18 is properly installed on wall 22, when remote control 12 is placed within magnetically attracting proximity to mounting plate, the magnetic section 116 of attachment plate 20 or magnetic member 80 of remote control 12 will automatically magnetically attract to the magnetic piece 126 of mounting plate 18 and remote control 12 will automatically self-orient as well as self-center on mounting plate 18. That is, when remote control 12 is placed on mounting plate 18, remote control 12 will self-orient meaning that remote control 12 will spin in a clockwise or counter-clockwise direction to align the magnetic section 116 of attachment plate 20 or magnetic member 80 of remote control 12 with the magnetic piece 126 of mounting plate 18. Similarly, when remote control 12 is placed on mounting plate 18, remote control 12 will self-center, meaning that remote control 12 will move vertically and/or laterally to precisely align the magnetic section 116 of attachment plate 20 or magnetic member 80 of remote control 12 with magnetic piece 126 of mounting plate 18. In this way, the system 10 ensures the remote control 12, when installed on the adhering plate 14 is always pointed up (or any other desired direction) and is centered on the mounting plate 18.

Also, in the arrangement shown, as one example, a durable arrangement is presented because a layer of material is positioned between magnetic piece 126 of mounting plate 18 and magnetic member 80 or magnetic section 116 of attachment plate 20 of remote control 12 when they magnetically connect to one another. That is, the back side 34 of remote control 12 and the front side 118 of mounting plate 18 is positioned between magnetic member 80 or magnetic section 116 of attachment plate 20 of remote control 12 and magnetic piece 126. This layer helps to prevent some of the magnetic attraction by preventing direct magnet-on-magnet connection, which allows for easier removal while still providing a strong magnetic hold. This arrangement provides for a more durable design.

In the arrangement shown, as one example, mounting plate 18 is in flush, planar engagement with remote control 12 such that no components of mounting plate 18 pass the plane formed by the back side 34 of remote control 12 when viewing remote control 12 and mounting plate 18 assembly from the side. This is an advantageous feature because it provides the user with a clear and easy path to remote control 12. The user is able to easily grab remote control 12 without any interference from mounting plate 18. This arrangement allows for the user to pull remote control 12 out of magnetic engagement with mounting plate 18 either by pulling directly away from mounting plate 18 or by sliding remote control 12 in a lateral movement to easily break the magnetic attraction. This feature is advantageous because it also aids the user in replacing remote control 12 to mounting plate 18 without any additional accuracy or care. This makes replacing and removing remote control 12 from mounting plate 18 easy and efficient. In addition, as the front surface of mounting plate 18 is flat and does not have any protruding features, remote control 12 is allowed to slide and rotate upon the front surface of the mounting plate 18 so as to self-orient as well as self-center.

Attachment & Removal: In the arrangement shown, as one example, a user must first attach an adhering plate 14, or alternatively a mounting plate 18, to a wall 22 or surface. As is pointed out in detail herein, an adhesive 16 coats the back side 112 of adhering plate 14. A user removes the thin cover from adhesive 16 or otherwise attaches the adhesive 16 or activates the adhesive 16. Following removing the cover or attaching or activating the adhesive 16, a user firmly presses adhering plate 14 against a wall 22 or surface at a desired location forcing adhesive 16 to come into flush, planar alignment with a wall 22 or surface. Also, in an arrangement shown, a mounting plate 18 may be used in a similar manner. Care is taken when installing to ensure the proper orientation is achieved, such as the up-end facing upward—which correlates to the orientation of the magnetic component(s) of the adhering plate 14 of mounting plate 18.

In an alternative embodiment, a screw, a nail, or other fastening device can be used to attach attachment plate 20 to a wall 22 or surface. While these attachment means are shown in the examples, other attachment means are hereby contemplated for use which facilitate attaching adhering plate 14, mounting plate 18, or attachment plate 20 a wall 22 or surface.

Furthermore, the arrangement shown, as one example, has a significant advantage in functionality of both attachment and removal of remote control 12 from adhering plate 14 or mounting plate 18. In the arrangement shown, as one example, adhering plate 14 is in flush, planar engagement with remote control 12 such that no components of adhering plate 14 pass the plane formed by the back side 34 of remote control 12 when remote control 12 and adhering plate 14 are viewed from the side. This is an advantageous feature because it provides the user with clear and easy access to remote control 12.

Thus, the user is able to easily grab remote control 12 without any interference from adhering plate 14. This arrangement allows for the user to pull remote control 12 out of magnetic engagement with adhering plate 14 while gripping the exterior peripheral edge 28 of remote control 12. In addition to the capability of being able to pull remote control 12 directly away from magnetic engagement with adhering plate 14, the user can remove remote control 12 from adhering plate 14 by laterally sliding remote control 12 in any direction laterally or vertically or any combination thereof. This functionality adds greatly to the attachment and removal capabilities of the system 10. Finally, this functionality makes removal and replacement of remote control 12 to adhering plate 14 fun, easy, quick, and efficient.

Self-Centering: In the arrangement shown, as one example, a system 10 that is capable of self-centering is presented. As an example of off center installation, when remote control 12 is placed in flush, planar engagement with adhering plate 14, remote control 12 may be laterally to the left or right of center alignment with respect to the adhering plate 14. This is undesirable in most circumstances because if remote control 12 is in off center alignment, then adhering plate 14 may be exposed on either the left side or the right side of the remote 12. Adhering plate 14 is designed to be completely concealed behind remote control 12 for an aesthetically pleasing appearance. Similarly, remote control 12 may be vertically too far to the top of center alignment with adhering plate 14, or too far to the bottom of center alignment with adhering plate 14. This too is undesirable. A self-centering remote control 12 is therefore desirable so that a user has ease in placing remote control 12 on adhering plate 14, or alternatively mounting plate 18.

In the arrangement shown, as one example, magnetic member 80 or magnetic section 116 of attachment plate 20 of remote control 12 is laterally centered and vertically centered within or on remote control 12. Additionally, magnetic section 116 of adhering plate 14 is laterally centered and vertically centered within or on adhering plate 14. In an alternative embodiment, magnetic piece 126 of mounting plate 18 is also laterally centered and vertically centered within or on the back side 120 of mounting plate 18. This arrangement causes the magnetic attraction of magnetic member 80 and magnetic section 116 to center remote control 12 on adhering plate 14, or alternatively to center remote control 12 on mounting plate 18. That is, the orientation and placement of the magnet components of the remote control 12 and the orientation and placement of the magnetic components of the adhering plate 14 or mounting plate 18 work in concert with one another to pull the remote control 12 into a precisely centered and aligned condition. In doing so, the user places the remote control 12 within close alignment with the adhering plate 14 or mounting plate 18. Once the user releases their grip on the remote control 12, the magnetic attraction between the magnetic components of the remote control 12 and the magnetic components of either the adhering plate 14 or mounting plate 18 take over and pull toward one another thereby causing the rear face of the remote control 12 to slide over the forward face of adhering plate 14 or mounting plate 18 until the remote 12 is precisely centered at which point the magnetic attraction between the magnetic components of the remote control 12 and adhering plate 14 or mounting plate 18 hold one another together.

As one example, when a user places remote control 12 in flush, planar alignment with adhering plate 14, if remote control 12 is off center, then the magnetic attraction will pull remote control 12 to center alignment both laterally and vertically upon the user's release of remote control 12.

Self-Orienting: In the arrangement shown, as one example, a system 10 is presented that is capable of self-orienting. As an example of self-orienting, when remote control 12 is placed in flush, planar engagement with adhering plate 14, remote control 12 may be both laterally off center as well as upside down or off by an angle or a rotation which is not the usual clockwise or counter-clockwise orientation of remote control 12 with the engagement of adhering plate 14. This is undesirable as a user may want to have remote control 12 oriented the same for every single use, or alternatively so remote control 12 can be used while in magnetic attachment with adhering plate 14. Thus, a self-orienting remote control 12 is desirable so that a user has ease in placing and removing remote control 12 from adhering plate 14, or alternatively mounting plate 18. That is, regardless of how the remote control 12 is placed on the adhering plate In addition to the self-centering functionality discussed herein, the arrangement shown, as one example, features self-orienting capabilities. The arrangement shown, as one example, is configured to ensure remote control 12 will be self-orienting with relation to adhering plate 14. In this arrangement, magnetic member 80 or magnetic section 116 of remote control 12 is a dipole magnet wherein one end of the magnet is a north pole and the other end of the magnet is a south pole. Magnetic section 116 of adhering plate 14 has a similar arrangement. Care is taken to install the magnetic members of remote control 12 and adhering plate 14 such that they are aligned to attract to one another to result in the proper orientation of the remote control 12 once installed. In this arrangement, remote control 12 will be self-orienting such that remote control 12 will spin in a clockwise or counter-clockwise direction until the remote control 12 is precisely oriented with respect to the adhering plate 14. In this arrangement, remote control 12 will self-orient in such a way that the same end of remote control 12 will always be facing the same direction when remote control 12 is mounted in flush, planar engagement with adhering plate 14.

In an alternative embodiment, magnetic piece 126 of mounting plate 18 is configured in the same manner as magnetic section 116 of adhering plate 14 such that the same self-orienting occurs during the attachment process.

Magnetic Member 80, Magnetic Section 116, Magnetic Piece 126: There are several terms used herein to describe magnetic components of the system such as magnetic member 80, magnetic section 116, magnetic piece 126 and the like. It is to be understood that all of these terms describe a magnetic component that may be stand-alone or incorporated within other components. These terms are to be broadly construed as meaning a magnetic component.

Also, in the arrangement shown, where adhering plate 14 and attachment plate 20 include a magnetic section 116, the magnetic section 116 is to be magnetic whereas areas outside of the magnetic section 116 are not magnetic. This separation between magnetic portions of adhering plate 14 and attachment plate 20 and non-magnetic portions of adhering plate 14 and attachment plate 20 help to facilitate the self-orienting and self-centering of the remote control 12.

Planar Shape: One of the benefits of the system 10, while subtle in nature, is important, and that is the planar shape of adhering plate 14 and/or attachment plate 20. The planar nature of adhering plate 14 and/or attachment plate 20 provides a component that has maximum surface area while also being of minimal thickness. This maximizes magnetic attraction while also providing a low-profile and almost hidden appearance when remote control 12 is removed. This configuration also allows the adhering plate 14 to blend in with the wall 22 it is attached to when a remote control 12 is not attached, especially when painted or covered with a matching decal or sticker or other surface treatment.

It will be appreciated by those skilled in the art that other various modifications could be made to the device without parting from the spirit and scope of this disclosure. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included within the spirit and purview of this application.

What is claimed:

1. A remote control system, comprising:
    a remote control;
        the remote control having a main body;
        the main body of the remote control having a front side and a back side;
        the main body of the remote control having an exterior peripheral edge;
        wherein the back side of the remote control has a continuous flat surface terminating at the exterior peripheral edge of the main body of the remote control;
        a magnetic member operatively connected to the remote control;
    an adhering plate;
        the adhering plate having a front side;
        the adhering plate having a generally flat back side opposite the front side;
        the adhering plate having an exterior peripheral edge;
        wherein the front side of the adhering plate has a continuous flat surface terminating at the exterior peripheral edge of the adhering plate;
        wherein the adhering plate has at least a portion that is magnetic;
    wherein the adhering plate is configured to be attached to a wall;
    wherein the remote control is configured to be magnetically attached to and removed from the adhering plate after the adhering plate is adhered to the wall;
    wherein when the remote control is magnetically attached to the adhering plate the adhering plate is concealed behind the remote control.

2. The system of claim 1, wherein when the remote control is magnetically attached to the adhering plate the adhering plate is concealed behind the remote control as the exterior peripheral edge of the remote control extends past the exterior peripheral edge of the adhering plate.

3. The system of claim 1, further comprising:
    an adhesive;
    the adhesive operably attached to the back side of the adhering plate;
    wherein the adhering plate is configured to be adhesively attached to the wall using the adhesive.

4. The system of claim 1, wherein the adhering plate is configured to be attached to the wall using at least one fastener.

5. The system of claim 1, wherein the main body of the remote control has a hollow interior wherein the magnetic member is positioned within the hollow interior of the main body.

6. The system of claim 1, wherein the magnetic member is connected to the back side of the remote control.

7. The system of claim 1, wherein the magnetic member is adhesively connected to the back side of the remote control.

8. The system of claim 1, wherein the magnetic member is planar in shape and has an exterior peripheral edge that is aligned with the exterior peripheral edge of the remote control.

9. The system of claim 1, wherein the magnetic member is planar in shape and has an exterior peripheral edge that is flush with the exterior peripheral edge of the remote control.

10. The system of claim 1, wherein the magnetic member is planar in shape and has an exterior peripheral edge that is slightly smaller than the exterior peripheral edge of the remote control and the exterior peripheral edge of the magnetic member is aligned within the exterior peripheral edge of the remote control.

11. The system of claim 1, wherein the surface area of the front side of the adhering plate is less than the surface area of the front side of the remote control.

12. The system of claim 1, wherein the adhering plate is formed of a ferrous material.

13. The system of claim 1, wherein the adhering plate is magnetic.

14. The system of claim 1, wherein the adhering plate includes a magnetic section.

15. The system of claim 1, wherein when the remote control magnetically attaches to the adhering plate the remote control automatically self-centers upon the adhering plate.

16. The system of claim 1, wherein when the remote control magnetically attaches to the adhering plate the remote control magnetically self-centers upon the adhering plate.

17. The system of claim 1, wherein when the remote control magnetically attaches to the adhering plate the magnetic member of the remote control self-centers upon a magnetic section of the adhering plate.

18. The system of claim 1, wherein when the remote control magnetically attaches to the adhering plate the remote control automatically self-centers upon the adhering plate by magnetic alignment of the magnetic member of the remote control with a magnetic section of the adhering plate.

19. The system of claim 1, wherein when the remote control magnetically attaches to the adhering plate the remote control automatically self-orients upon the adhering plate.

20. The system of claim 1, wherein when the remote control magnetically attaches to the adhering plate the remote control magnetically self-orients upon the adhering plate.

21. The system of claim 1, wherein when the remote control magnetically attaches to the adhering plate the magnetic member of the remote control self-orients upon a magnetic section of the adhering plate.

22. A remote control system, comprising:
a remote control;
the remote control having a main body;
the main body of the remote control having a front side and a back side;
the main body of the remote control having an exterior peripheral edge;
the back side of the main body having a uniform flat exterior surface extending between the exterior peripheral edge of the main body;
a magnetic member operatively connected to the remote control;
an adhering plate;
the adhering plate having an exterior peripheral edge;
the adhering plate having a uniform flat front side extending between the exterior peripheral edge of the adhering plate;
the adhering plate having a uniform flat back side opposite the front side;
wherein the adhering plate is configured to be attached to a wall;
wherein the remote control is configured to be magnetically attached to and removed from the adhering plate after the adhering plate is adhered to the wall;
wherein when the remote control magnetically attaches to the adhering plate the remote control automatically self-centers upon the adhering plate.

23. The system of 22, wherein when the remote control is magnetically attached to the adhering plate the adhering plate is concealed behind the remote control as the exterior peripheral edge of the remote control extends past the exterior peripheral edge of the adhering plate.

24. The system of 22, further comprising:
an adhesive;
the adhesive operably attached to the back side of the adhering plate;
wherein the adhering plate is configured to be adhesively attached to the wall using the adhesive.

25. The system of 22, wherein the adhering plate is configured to be attached to the wall using at least one fastener.

26. The system of claim 22, wherein when the remote control is magnetically attached to the adhering plate the adhering plate is completely concealed behind the remote control.

27. The system of claim 22, wherein the main body of the remote control has a hollow interior wherein the magnetic member is positioned within the hollow interior of the main body.

28. The system of claim 22, wherein the magnetic member is connected to the back side of the remote control.

29. The system of claim 22, wherein the magnetic member is planar in shape and has an exterior peripheral edge that is aligned with the exterior peripheral edge of the remote control.

30. The system of claim 22, wherein the magnetic member is planar in shape and has an exterior peripheral edge that is slightly smaller than the exterior peripheral edge of the remote control and the exterior peripheral edge of the magnetic member is aligned within the exterior peripheral edge of the remote control.

31. The system of claim 22, wherein the surface area of the front side of the adhering plate is less than the surface area of the front side of the remote control.

32. The system of claim 22, wherein the adhering plate is formed of a ferrous material.

33. The system of claim 22, wherein the adhering plate is magnetic.

34. The system of claim 22, wherein the adhering plate includes a magnetic section.

35. The system of claim 22, wherein when the remote control magnetically attaches to the adhering plate the remote control magnetically self-centers upon the adhering plate.

36. The system of claim 22, wherein when the remote control magnetically attaches to the adhering plate the magnetic member of the remote control self-centers upon a magnetic section of the adhering plate.

37. The system of claim 22, wherein when the remote control magnetically attaches to the adhering plate the remote control automatically self-centers upon the adhering plate by magnetic alignment of the magnetic member of the remote control with a magnetic section of the adhering plate.

38. The system of claim 22, wherein when the remote control magnetically attaches to the adhering plate the remote control automatically self-orients upon the adhering plate.

39. A remote control system, comprising:
a remote control;
the remote control having a main body;
the main body of the remote control having a front side and a back side;
the main body of the remote control having an exterior peripheral edge;
a magnetic member operatively connected to the remote control;
an adhering plate;
the adhering plate having a generally flat front side;
the adhering plate having a generally flat back side opposite the front side;
the adhering plate having an exterior peripheral edge;
wherein the adhering plate is configured to be attached to a wall;
wherein the remote control is configured to be magnetically attached to and removed from the adhering plate after the adhering plate is adhered to the wall;

wherein when the remote control magnetically attaches to the adhering plate the remote control automatically self-orients upon the adhering plate.

40. The system of claim 39, wherein when the remote control magnetically attaches to the adhering plate the remote control magnetically self-orients upon the adhering plate.

41. The system of claim 39, wherein when the remote control magnetically attaches to the adhering plate the magnetic member of the remote control self-orients upon a magnetic section of the adhering plate.

42. The system of 39, wherein when the remote control is magnetically attached to the adhering plate the adhering plate is concealed behind the remote control as the exterior peripheral edge of the remote control extends past the exterior peripheral edge of the adhering plate.

43. The system of 39, further comprising:
an adhesive;
the adhesive operably attached to the back side of the adhering plate;
wherein the adhering plate is configured to be adhesively attached to the wall using the adhesive.

44. The system of claim 39, wherein when the remote control magnetically attaches to the adhering plate the remote control magnetically self-centers upon the adhering plate.

45. The system of claim 39, wherein when the remote control magnetically attaches to the adhering plate the magnetic member of the remote control self-centers upon a magnetic section of the adhering plate.

46. The system of claim 39, wherein when the remote control magnetically attaches to the adhering plate the remote control automatically self-centers upon the adhering plate by magnetic alignment of the magnetic member of the remote control with a magnetic section of the adhering plate.

47. A remote control system, comprising:
a remote control;
the remote control having a main body;
the main body of the remote control having a front side and a back side;
the main body of the remote control having an exterior peripheral edge;
the back side of the main body having a uniform flat back surface;
a magnetic member operatively connected to the remote control;
an adhering plate;
the adhering plate having a uniform flat front side;
wherein the flat front side is a forwardmost portion of the adhering plate;
the adhering plate having a generally flat back side opposite the front side;
the adhering plate having an exterior peripheral edge;
wherein the adhering plate is configured to be attached to a wall;
wherein the remote control is configured to be magnetically attached to and removed from the adhering plate after the adhering plate is adhered to the wall;
wherein when the remote control magnetically attaches to the adhering plate the remote control automatically self-centers and self-orients upon the adhering plate.

48. The system of claim 1, wherein when the remote control is attached to the adhering plate, the back side of the remote is oriented in a first plane;
wherein the front side of the adhering plate and the back side of the remote control are configured to permit the back side of the remote control to move in the first plane, thereby permitting the magnetic member to reorient the remote control.

49. The system of claim 48, wherein reorienting of remote by the magnetic member includes, when the remote control is positioned at an angle relative to the adhering plate, rotating the remote control.

50. The system of claim 1, wherein the magnetic member operatively connected to the remote control is a first dipole magnet having a north pole at a first end, positioned at a first portion of the back side of the main body, and a south pole at a second end, positioned at a second portion of the back side of the main body that is different from the first portion of the main body;
wherein the adhering plate includes a second magnetic member;
wherein the second magnetic member is a second dipole magnet having a north pole at a first end, positioned at a first portion of the front side of the adhering plate, and a south pole at a second end, positioned at a second portion of the front side of the adhering plate that is different from the first portion of the adhering plate.

51. The system of claim 1, wherein the continuous flat surface of the front side of the adhering plate is configured to facilitate application of a sticker thereon.

52. The system of claim 1, wherein the continuous flat surface of the front side of the adhering plate has a roughened or textured surface configured to facilitate painting of the continuous flat surface.

* * * * *